(12) United States Patent
Okada et al.

(10) Patent No.: US 7,678,360 B2
(45) Date of Patent: Mar. 16, 2010

(54) ALUNITE TYPE COMPOUND PARTICLES, MANUFACTURING PROCESS THEREOF AND USE THEREOF

(75) Inventors: Akira Okada, Sakaide (JP); Xing Dong Wang, Sakaide (JP); Takatoshi Sato, Sakaide (JP)

(73) Assignee: Kyowa Chemical Industry Co., Ltd., Kagawa (JP)

( * ) Notice: Subject to any disclaimer, the term of this patent is extended or adjusted under 35 U.S.C. 154(b) by 118 days.

(21) Appl. No.: 11/887,779

(22) PCT Filed: Apr. 6, 2006

(86) PCT No.: PCT/JP2006/307798

§ 371 (c)(1),
(2), (4) Date: Oct. 3, 2007

(87) PCT Pub. No.: WO2006/109847

PCT Pub. Date: Oct. 19, 2006

(65) Prior Publication Data

US 2009/0012223 A1 Jan. 8, 2009

(30) Foreign Application Priority Data

Apr. 8, 2005 (JP) ............................. 2005-111733

(51) Int. Cl.
*C01B 17/96* (2006.01)
*C01D 5/10* (2006.01)
*C04B 28/14* (2006.01)

(52) U.S. Cl. ..................... 423/544; 524/423; 423/518

(58) Field of Classification Search ....................... None
See application file for complete search history.

(56) References Cited

U.S. PATENT DOCUMENTS 4,170,087 A * 10/1979 Tapia .......................... 47/29.4
5,258,168 A * 11/1993 Misra .......................... 423/117

FOREIGN PATENT DOCUMENTS

JP 64-11637 1/1989
JP 64-11638 1/1989
JP 6-122519 5/1994
JP 2000-7326 1/2000
SU 945118 10/1980

OTHER PUBLICATIONS

Ozacar, Mahmut "Adsorption of Phosphate from Aqueous Solution onto alunite". Chemosphere 51 (2003) 321-327.*
Ozacar, Mahmut "Phosphate adsorption Characterics of Alunite to be used as a cement additive". Cement and Concrete Research 33 (2003) 1583-1587.*
Matijevic, Egon et al. "Ferric Hydrous Oxide Sols". Journal of Colloid and Interface Science, vol. 50, No. 3, Mar. 1975.*
Ozacar, Mahmut et al. "Application of Kinetic Models to the sorption of disperse dyes onto alunite". Colloids and Surfaces A: Physiochem. Eng. Aspects 242 (2004) 105-113.*
Motoharu Kawano et al., "*Syntheses and High Temperature Phase Transformations of Alunite-Natroalunite Solid Solution Series*", Magazine of Mineralogy, vol. 20, Nos. 1 and 2, pp. 13-23 (1991).
Katsuya Inouye et al., "*The High-order Structure and Dye Adsorption of a Porous Alunite*", The Chemical Society of Japan, vol. 2, pp. 156-162 (1985).

* cited by examiner

*Primary Examiner*—Melvin C Mayes
*Assistant Examiner*—Sheng Han
(74) *Attorney, Agent, or Firm*—Wenderoth, Lind & Ponack, L.L.P.

(57) ABSTRACT

Alunite type compound particles represented by the following general formula (I) and having a specific value of $D_{75}/D_{25}$ when $D_{25}$ is the particle diameter of particles which account for 25% of the total and $D_{75}$ is the particle diameter of particles which account for 75% of the total in the cumulative particle size distribution curve measured by a laser diffraction method:

$$M_a[Al_{1-x}M'_x]_3(SO_4^{2-})_y(OH)_z \cdot mH_2O \qquad (I)$$

wherein M is at least one cation selected from the group consisting of $Na^+$, $K^+$, $NH_4^+$ and $H_3O^+$, M' is at least one cation selected from the group consisting of $Cu^{2+}$, $Zn^{2+}$, $Ni^{2+}$, $Sn^{4+}$, $Zr^{4+}$ and $Ti^{4+}$, and a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, respectively. The above particles of the present invention have a small average particle diameter, are spherical, disk-like or hexagonal and have an extremely narrow particle size distribution.

20 Claims, 13 Drawing Sheets

ALUNITE TYPE COMPOUND PARTICLES, MANUFACTURING PROCESS THEREOF AND USE THEREOF

TECHNICAL FIELD

The present invention relates to alunite type compound particles, a manufacturing process thereof and use thereof. That is, it relates to alunite type compound particles which can be used in a wide variety of fields such as construction, foods, semiconductors, electrophotography, medical treatment, cosmetics, chemicals, resins, fibers, rubbers and other industrial fields and a manufacturing process thereof.

BACKGROUND ART

A typical example of the alunite type compound is alunite. Natural alunite is existent as alumstone in thermal deposits and acid corroded districts formed by active volcanoes and hot springs. Synthetic alunite is industrially used as an adsorbent, additive for resins, filler or carrier. The following synthesizing methods are known.

In the specification of the present invention, documents 1 to 6 mean the following.

document 1: Kohno et al., "Magazine of Mineralogy", vol. 20, Nos. 1 and 2, pp. 13-23, January and April, 1991

(2) document 2: Inoue et al., "Bulletin of the Japan Society of Chemistry", No. 2, pp. 156-162, 1985

(3) document 3: JP-A 64-11637

(4) document 4: JP-A 64-11638

(5) document 5: JP-A 2000-7326

(6) document 6: JP-A 6-122519

Document 1 discloses a method of synthesizing alumstone by mixing aluminum sulfate, potassium sulfate and sodium sulfate in a fixed ratio and stirring them at 100° C. under atmospheric pressure for 48 hours.

Document 2 discloses a method of producing alunite having a specific surface area of 200 to 240 $m^2/g$ by adding potassium sulfate and potassium hydroxide to an aqueous solution of aluminum sulfate so as to adjust the K/Al ratio to 5 and pH to 3.7 and boiling and refluxing the resulting mixture for 3 hours. It is reported that the alunite produced by this method contains slit-like pores with a diameter of 14 Å and a width of 30 Å, has water absorptivity equivalent to that of silica gel and high $SO_2$ and NO absorptivity, and adsorbs an acid dye well.

As means of manufacturing alunite compounds at a low cost and high yield so as to use them as adsorbents in industrial fields, manufacturing processes disclosed by documents 3, 4 and 5 are known.

Document 3 discloses an alunite type adsorbent which has a BET specific surface area of 280 $m^2/g$ or more and a total volume of pores having a diameter of 10 to 300 Å of 0.05 ml/g or more and is represented by the following formula:

$$MM'_3(SO_4)_2(OH)_6$$

wherein M is a monovalent cation, and M' is Al or a combination of Al and Fe(III).

For the synthesis of the adsorbent, document 3 teaches a method for crystallizing an alunite type lamellar compound having an increased specific surface area by maintaining pH of a reaction solution at 4.0 to 4.4 from the beginning of a reaction and at not less than 3.8 during a reaction when aluminum sulfate or a combination of aluminum sulfate and ferric sulfate is thermally reacted with an excessive amount of an alkali sulfate in an aqueous solvent containing an alkali hydroxide.

Document 4 discloses an adsorbent composition which has a BET specific surface area of 300 $m^2/g$ or more and a pore volume of 0.1 ml/g or more and is an homogeneous composition comprising a lamellar compound having a chemical structure represented by $MM'_3(SO_4)_2(OH)_6$ (M is a monovalent cation, and M' is Al or Fe (III)) and an alunite or jarosite type crystal structure and 5 to 80 wt % based on the lamellar compound of amorphous silica or amorphous silica alumina. As for the manufacturing process of the adsorbent composition, document 4 teaches that alunite and jarosite type lamellar compounds can be crystallized according to starting materials and the value of pH during a reaction.

Document 5 discloses an alkali aluminum sulfate hydroxide whose individual particles are independently spindle-like or spherical and which is represented by $MAl_3(SO_4)_2(OH)_6$ (M is a monovalent alkali metal or ammonium group) and specified by its chemical composition that satisfies $1.2 \leq D_{25}/D_{75} \leq 2.0$ ($D_{25}$ is the particle diameter of particles which account for 25% of the total and $D_{75}$ is the particle diameter of particles which account for 75' of the total in a volume-based cumulative particle size distribution curve measured by a Coulter method), X-ray diffraction image different from that of alunite, pH of a 5% aqueous suspension, BET specific surface area and moisture absorptivity. Further, document 5 proposes an alkali aluminum sulfate hydroxide which has ideal parameters such as particle bulk density, volume-based median diameter, sharpness of particle size distribution, aspect ratio, refractive index and abrasion when it is added to a resin. As for its manufacturing process, document 5 teaches that that aluminum sulfate, alkali sulfate or ammonium sulfate and aluminum hydroxide are hydrothermally treated. Document 5 also suggests a method of controlling the shape of each particle to a spherical or spindle-like shape by the content of alumina in a reaction system.

The $D_{25}/D_{75}$ ratio of the particles actually obtained in document 5 is in the range of 1.45 to 1.61.

Meanwhile, document 6 discloses "jarosite particles (amorphous hydrous ferric oxide particulate powders)" which are spherical, have an average particle diameter of 3 to 30 μm, a BET specific surface area of 150 to 300 $m^2/g$ and a bulk density of 0.7 to 1.1 g/ml and are represented by $RFe_3(SO_4)_2(OH)_6$ 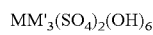 (R is $K^+$, $Na^+$, $NH_4^+$, etc.) as well as a synthesizing method thereof. Document 4 proposes a method of synthesizing jarosite particles by letting an oxygen-containing gas pass through a mixture of an aqueous solution of ferrous sulfate and an aqueous solution of a sulfate of an alkali metal or ammonium ion to carry out an oxidation reaction at a temperature higher than 45° C. and lower than the boiling point.

DISCLOSURE OF THE INVENTION

Documents 2 to 6 propose that a synthesized alunite compound can be used as an additive or filler for resins and rubbers, adsorbent for odor components, dye carrier, etc. In general, when it is used as an additive or filler for resins and rubbers, it is often required to have not only low moisture absorptivity, acid resistance and high dispersibility so as to suppress the deterioration of its mechanical properties such as tensile strength as much as possible but also transparency (total light transmittance becomes higher and haze becomes lower as the particle diameter decreases), anti-block properties, slipping properties, and fixed particle shape and particle size uniformity (sharpness of particle size distribution) for closest packing, according to its application purpose. In order to satisfy all of the above requirements, it is essential that the particle diameter should be reduced while dispersibility in a resin is maintained and also that the fixed particle shape and the particle size uniformity should be ensured. The above requirements are contradictory to each other. When the particle diameter is reduced to improve mechanical properties and transparency, secondary agglomeration tends to occur, thereby reducing dispersibility in a resin or rubber and causing the deterioration of mechanical properties, transparency and anti-block properties.

Further, in the additive market of nowadays, additive particles are often required to have a fixed shape according to each application purpose. For example, a filler for semiconductor sealers is required to be a spherical fine particle whereas a disk-like, "go" stone-like or hexagonal particle is required for a polyester film which is a base material for audio tapes to prevent desorption. However, it is extremely difficult to control the shape of each particle, and additive particles which are uniform in shape and size have not been proposed up till now.

Document 5 suggests a method of controlling the shape of each particle to a spherical or spindle-like shape by the content of alumina in the reaction system. This method is incomplete and also unpractical and uneconomical because the alkali hydroxide must be added as a pH controller to stabilize the shape of each particle while pH is measured at certain time intervals during the reaction. Document 5 does not refer to the method of controlling the particle diameter and particle size distribution which are important parameters. The particles having a fixed shape disclosed and actually manufactured in the above document have a relatively large particle diameter of 2 μm or more and a $D_{25}/D_{75}$ ratio representing particle size uniformity of at least 1.45. Thus, the particles greatly vary in size and cannot meet the above requirements for resin additives.

In the above document 5, the average particle diameter (median diameter) and the sharpness ($R_s=D_{25}/D_{75}$) of the cumulative particle size distribution curve of the particles are values calculated based on volume measured by the Coulter method (electric resistance method). The values of average particle diameter and sharpness ($R_s$) measured by the Coulter method are not always the same as and differ from values obtained by a laser diffraction method. For the recent measurement of average particle diameter and particle size distribution of fine particles, the laser diffraction method is becoming popular, and the Coulter method is not suitable for the measurement of fine particles having an average particle diameter of 0.5 μm or less, particularly 0.2 μm or less. Therefore, the average particle diameter and particle size distribution of fine particle were measured by the laser diffraction method in the present invention.

Documents 3, 4 and 6 do not fully disclose particle shape, particle size uniformity and a method of ensuring these properties. Blendability, that is, dispersibility in a resin or the retention of mechanical properties such as tensile strength is unclear. Particularly, documents 3 and 4 disclose a method of obtaining alunite compound particles having a large BET specific surface area by adding an excessive amount of the alkali sulfate. However, particles obtained by this method have a large average particle diameter and are not uniform in size.

Meanwhile, to use the particle as an adsorbent or carrier, water absorptivity must be minimized as much as possible. In this respect, the composition disclosed by document 2 has high moisture absorptivity and its gas absorptivity lowers in a high relative humidity environment, thereby making it impossible to use it as an additive for resins and rubbers. Adsorbents and carriers for industrial use are often used in a strong acid environment and need to be acid resistant in a case. In such applications, changes in crystal structure related to adsorption and support in a strong acid environment must be as small as possible. However, documents 3 to 6 are utterly silent about acid resistance.

It is a first object of the present invention to provide alunite type compound fine particles which are uniform in shape and size. It is a second object of the present invention to provide alunite type compound particles having a new shape which has been unknown and uniform in shape. It is a third object of the present invention to provide alunite type compound particles which are excellent in the absorptivity of an alkali substance, dispersibility in resins and rubbers and anti-block properties without losing their function in a strong acid environment, and do not deteriorate the physical properties of resins and rubbers even when they are added at a high density. It is a fourth object of the present invention to provide an adsorbent, carrier composition, resin additive and resin composition comprising the above alunite type compound particles.

The inventors of the present invention have conducted researches to overcome the above defects of the synthesized alunite type compound particles of the prior art and have obtained an unexpected result that spherical alunite type compound fine particles having particle size uniformity which have not been existent up till now can be synthesized by adding an aqueous solution of sodium hydroxide [NaOH] to ensure that the actual ratio becomes 2.4 to 4.0 based on the alkali equivalent ($=[NaOH]/[Al_2(SO_4)_3]=4$) theoretically specified by the following formula (II), that is, the alkali equivalent ratio becomes about 0.6 to 1.0 when the alkali theoretical amount is 1 in the known method of synthesizing alunite type compound particles by adding the aqueous solution of sodium hydroxide to a mixture solution of aluminum sulfate [$Al_2(SO_4)_3$] and sodium sulfate [$Na_2SO_4$] as a catalyst and carrying out a reaction by heating as disclosed by document 4.

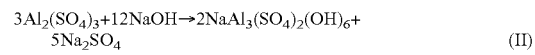

$$3Al_2(SO_4)_3 + 12NaOH \rightarrow 2NaAl_3(SO_4)_2(OH)_6 + 5Na_2SO_4 \qquad (II)$$

The inventors of the present invention have further proceeded with their researches based on the above finding and have found that not only spherical alunite type compound fine particles but also disk-like or hexagonal alunite type compound particles which could not been obtained by the prior art method and are fine and uniform in shape can be synthesized by setting the actual ratio to 2.4 to 4.4, preferably 3.2 to 4.0 based on the theoretically specified alkali equivalent (=[alkali hydroxide]/$Al_2(SO_4)_3$ (water-soluble compound))=4), that is, the alkali equivalent ratio when the alkali theoretical amount is 1 to 0.6 to 1.1 when the alunite type compound particles are synthesized by adding an aqueous solution of an alkali hydroxide containing a cation having an ion radius of 0.8 to 1.5 Å to a mixture solution of a compound of an element based on a cation having an ion radius of less than 0.8 Å and a coordination number of 6, which is water-soluble at a pH of 1 to 7, and a sulfate of the former cation and carrying out a reaction by heating. When a strong acid substance such as a titanate is used as the compound of an element based on a cation having an ion radius of less than 0.8 Å and a coordination number of 6, which is water-soluble at a pH of 1 to 7, the alkali equivalent ratio may be 0.6 to 1.2

The alunite compound particles obtained in the present invention are represented by the following chemical formula.

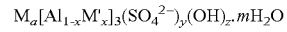

$$M_a[Al_{1-x}M'_x]_3(SO_4^{2-})_y(OH)_z \cdot mH_2O$$

In the above formula, M is at least one cation having an ion radius of 0.8 to 1.5 Å, preferably at least one cation selected from the group consisting of $Na^+$, $K^+$, $NH_4^+$ and $H_3O^+$. M' is a cation having an ion radius of less than 0.8 Å and a coordination number of 6, preferably at least one metal cation selected from the group consisting of $Cu^{2+}$, $Zn^{2+}$, $Ni^{2+}$, $Sn^{4+}$, $Zr^{4+}$ and $Ti^{4+}$.

a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, preferably $0.9 \leq a \leq 1.2$, $0 \leq m \leq 2$, $0 \leq x \leq 0.3$, $1.8 \leq y \leq 2.4$, and $5.2 \leq z \leq 6.2$, respectively.

The inventors of the present invention have also found that alunite type compound particles having a fixed particle shape according to type of the above M' can be obtained by optimizing the synthesizing method as will be described hereinafter, that is, not only spherical but also disk-like or hexagonal alunite type compound particles can be obtained by selecting M'.

According to the present invention, there are provided the following alunite type compound particles, manufacturing process thereof and use thereof.

(1) Alunite type compound particles which are represented by the following general formula (I) and have a particle size distribution sharpness Ds ($=D_{75}/D_{25}$) of 1 to 1.4 when $D_{25}$ is the particle diameter of particles which account for 25% of the total and $D_{75}$ is the particle diameter of particles which account for 75% of the total in the cumulative particle size distribution curve measured by a laser diffraction method and a spherical particle shape.

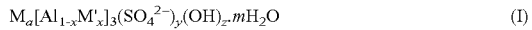

$$M_a[Al_{1-x}M'_x]_3(SO_4^{2-})_y(OH)_z \cdot mH_2O \quad (I)$$

(M is at least one cation selected from the group consisting of $Na^+$, $K^+$, $NH_4^+$ and $H_3O^+$, M' is at least one cation selected from the group consisting of $Cu^{2+}$, $Zn^{2+}$, $Ni^{2+}$, $Sn^{4+}$, $Zr^{4+}$ and $Ti^{4+}$, and a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, respectively.)

(2) The alunite type compound particles according to (1), which have a particle size distribution sharpness Ds ($=D_{75}/D_{25}$) of 1 to 1.3.

(3) The alunite type compound particles according to (1), which have an average secondary particle diameter measured by the laser diffraction method of 0.2 to 6 μm.

(4) The alunite type compound particles according to (1), which have an average secondary particle diameter measured by the laser diffraction method of 0.3 to 2 μm.

(5) Alunite type compound particles which are represented by the following general formula (I) and have a disk-like or hexagonal particle shape.

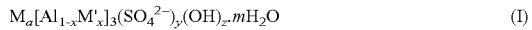

$$M_a[Al_{1-x}M'_x]_3(SO_4^{2-})_y(OH)_z \cdot mH_2O \quad (I)$$

(M is at least one cation selected from the group consisting of $Na^+$, $K^+$, $NH_4^+$ and $H_3O^+$, M' is at least one cation selected from the group consisting of $Cu^{2+}$, $Zn^{2+}$, $Ni^{2+}$, $Sn^{4+}$, $Zr^{4+}$ and $Ti^{4+}$, and a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, respectively.)

(6) The alunite type compound particles according to (5), which have a particle size distribution sharpness Ds ($=D_{75}/D_{25}$) of 1 to 1.8 when $D_{25}$ is the particle diameter of particles which account for 25% of the total and $D_{75}$ is the particle diameter of particles which account for 75% of the total in the cumulative particle size distribution curve measured by the laser diffraction method.

(7) The alunite type compound particles according to (5), which have a particle size distribution sharpness Ds ($=D_{75}/D_{25}$) of 1.01 to 1.7.

(8) The alunite type compound particles according to (5), which have an average secondary particle diameter measured by the laser diffraction method of 0.2 to 10 μm.

(9) The alunite type compound particles according to (5), which have an average secondary particle diameter measured by the laser diffraction method of 0.3 to 5 μm.

(10) The alunite type compound particles according to (1) or (5), which support a hydrolysate of at least one metal salt selected from the group consisting of Cu, Zn, Ni, Sn, Zr and Ti on the surface.

(11) The alunite type compound particles according to (1) or (5), which have an aspect ratio represented by the ratio of the short diameter S to the long diameter L of each particle of 0.6 to 1.0 in an SEM photomicrograph of the particle.

(12) The alunite type compound particles according to (1) or (5) whose surface is treated with at least one surface treating agent selected from the group consisting of a higher fatty acid, an anionic surfactant, a phosphate, a coupling agent and an ester of a polyhydric alcohol and an fatty acid.

(13) A process for manufacturing alunite type compound particles, comprising the steps of adding a hydroxide solution of at least one cation excluding $H_3O^+$, selected from the group (second group) consisting of $Na^+$, $K^+$, $NH_4^+$ and $H_3O^+$ to a mixture solution of a compound of an element based on at least one cation including $Al^{3+}$ as an essential component, selected from the group (first group) consisting of $Al^{3+}$, $Cu^{2+}$, $Zn^{2+}$, $Ni^{2+}$, $Sn^{4+}$ and $Zr^{4+}$, which is water-soluble at a pH of 1 to 7, and a sulfate of the above cation selected from the second group to ensure that the alkali equivalent ratio becomes 0.6 to 1.1 and carrying out a reaction by heating.

(14) A process for manufacturing alunite type compound particles comprising the steps of adding a hydroxide solution of at least one cation excluding $H_3O^+$, selected from the group (second group) consisting of $Na^+$, $K^+$, $NH_4^+$ and $H_3O^+$ to a mixture solution of compounds of elements based on at least two cations including $Al^{3+}$ and $Ti^{4+}$ as essential components, selected from the group (first group) consisting of $Al^{3+}$, $Cu^{2+}$, $Zn^{2+}$, $Ni^{2+}$, $Sn^{4+}$, $Zr^{4+}$ and $Ti^{4+}$, which are water-soluble at a pH of 1 to 7, and a sulfate of the above cation selected from the second group to ensure that the alkali equivalent ratio becomes 0.6 to 1.2 and carrying out a reaction by heating.

(15) The process for manufacturing alunite type compound particles according to (13) or (14), wherein the hydroxide solution is added to ensure that the alkali equivalent ratio becomes 0.7 to 0.9 and a reaction is carried out by heating.

(16) The process for manufacturing alunite type compound particles according to (13) or (14), wherein the reaction is carried out by heating at 90 to 250° C.

(17) A resin additive which comprises the alunite type compound particles of (1) or (5).

(18) A resin composition which comprises the alunite type compound particles of (1).

(19) An adsorbent composition which comprises the alunite type compound particles of (1) or (5).

(20) A dye carrier which comprises the alunite type compound particles of (1) or (5).

(21) An ultraviolet light absorber which comprises the alunite type compound particles of (1) or (5).

EFFECT OF THE INVENTION

A first effect of the present invention is that a process for manufacturing alunite type compound particles having a fixed shape and a fixed particle size for each application purpose and a carrier composition at a low cost, high reproducibility and a high yield can be provided.

A second effect of the present invention is that alunite type compound particles which are small in size and uniform in particle shape and size and have high dispersibility, low moisture absorptivity and acid resistance and a carrier composition can be provided.

A third effect of the present invention is that an additive for resins and rubbers which has high dispersibility even when it is added to a resin or rubber and can provide anti-block properties, acid resistance and other properties without reducing physical properties such as transparency and tensile strength and a carrier composition can be provided.

A fourth effect of the present invention is that an adsorbent which has high dispersibility and does not experience a reduction in adsorption/supporting capabilities even in a high relative humidity environment or strong acid environment can be provided.

According to the present invention, there are provided alunite type compound particles which are small in size and uniform in particle size and shape, have low moisture absorptivity and can be added to resins and rubbers, a manufacturing process thereof and use thereof. The alunite type compound particles of the present invention can be advantageously used in a wide variety of fields such as cement additives and curing accelerators; food additives and filtration aids for fermented foods such as beer and soy sauce; additives and carriers for agricultural chemicals and additives for agricultural films; additives for semiconductor sealers and additives for heat resistant ceramics; toners for electrophotography, toner external additives, cleaning agents and carriers for two-component toners; additives and carriers for medicines; additives for cosmetics, deodorants, anti-fungus agents, mildewcides, alga-proofing agents and their carriers; carriers and additives for dyes and pigments; catalysts; fiber deodorants, rubber and resin coloring aids, anchor coatings, thermoconductive material carriers, magnetic material carriers, conductivity providing material carriers, electromagnetic wave absorber carriers, anti-blocking agents and other additives; glass additives and foaming agents for the recycling of glass wastes; other abrasives, standard particles for correcting equipment, spacers for liquid crystal panels, ultraviolet and infrared light absorbers, treating agents for radioactive wastes, adsorbents for environmental pollutants and volatile organic components (VOC), etc.

BEST MODE FOR CARRYING OUT THE INVENTION

The alunite type compound particles and manufacturing process thereof of the present invention will be described in detail hereinunder.

As for the shape of the alunite type compound particles, as disclosed in the above document 5, spindle-like and spherical alunite type compound particles have been known. According to the present invention, there are provided alunite type compound particles which have a smoother surface and a much narrower particle size distribution ($D_{75}/D_{25}$) than these particles, that is, particle size uniformity, and a spherical shape or a new shape such as disk-like or hexagonal shape. The particles having a new shape of the present invention are characterized in that they are fine and uniform in particle shape and size. In addition, the particles of the present invention have low cohesiveness and high dispersibility irrespective of their shape although they are small in size. The above feature of the particle shape of the alunite type compound particles of the present invention can be understood from FIGS. 6 to 8 attached herewith.

Figure 6:
FIG. 6 is a SEM photomicrograph of spherical particles of Example 1-D.
Figure 7:
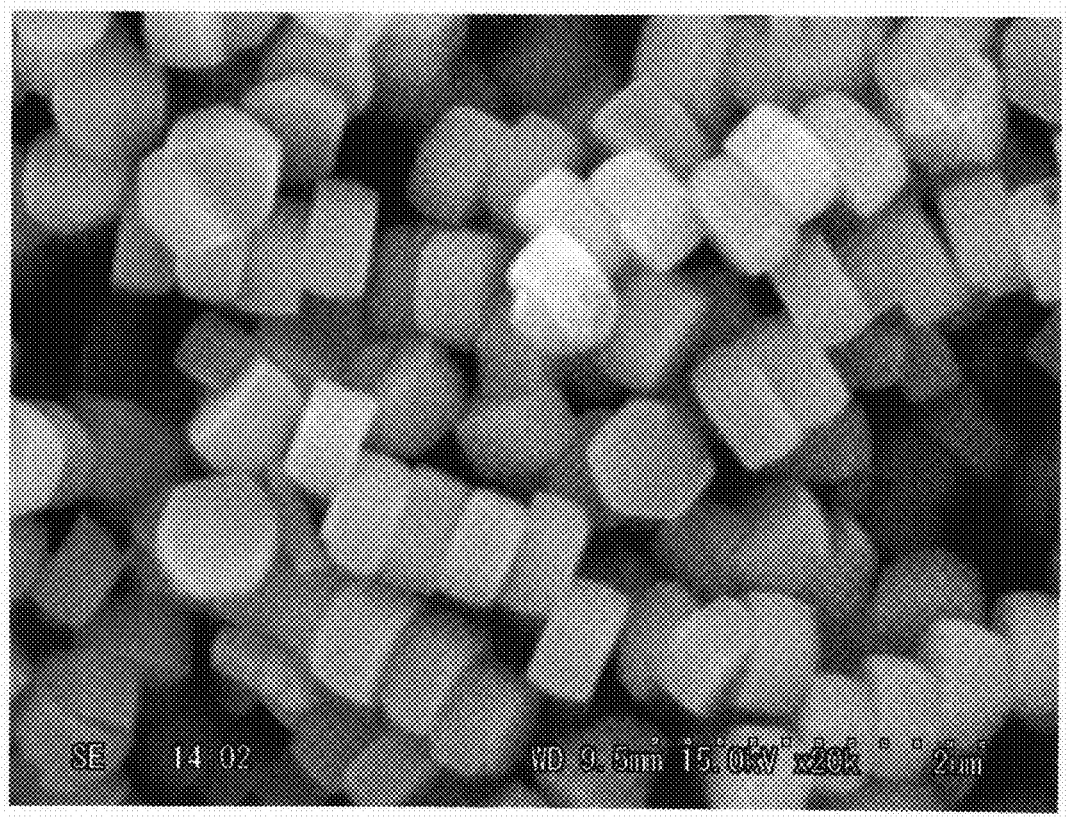
FIG. 7 is an SEM photomicrograph of hexagonal particles of Example 2-C.
Figure 8:
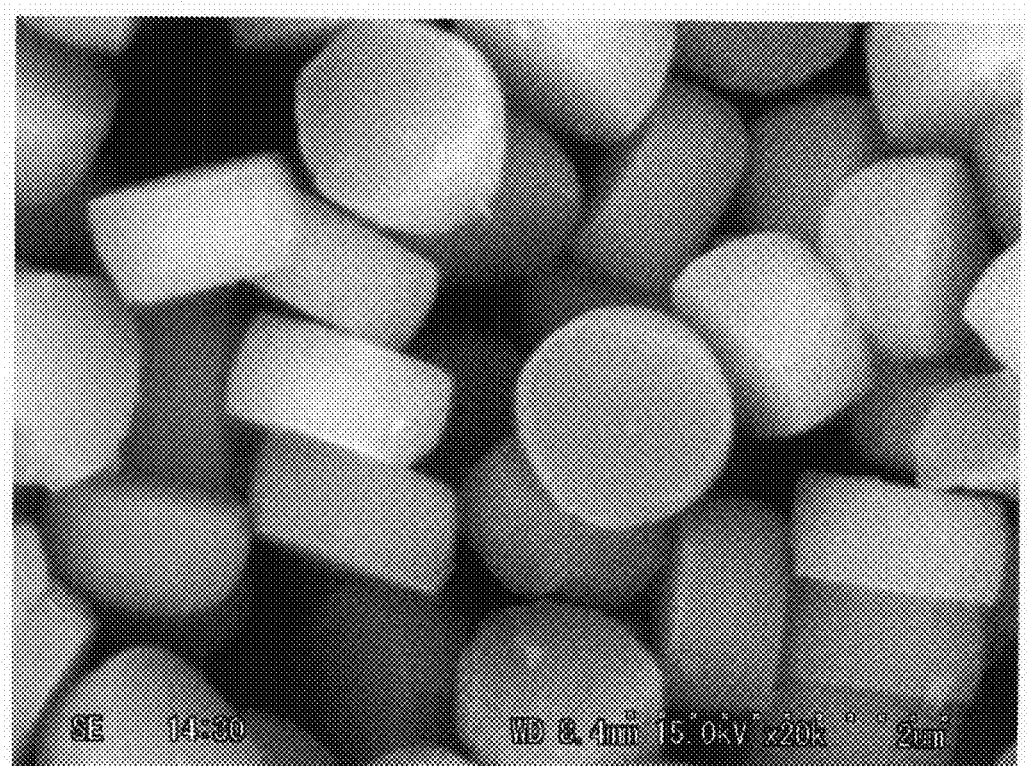
FIG. 8 is an SEM photomicrograph of disk-like particles of Example 1-K.
Figure 14:
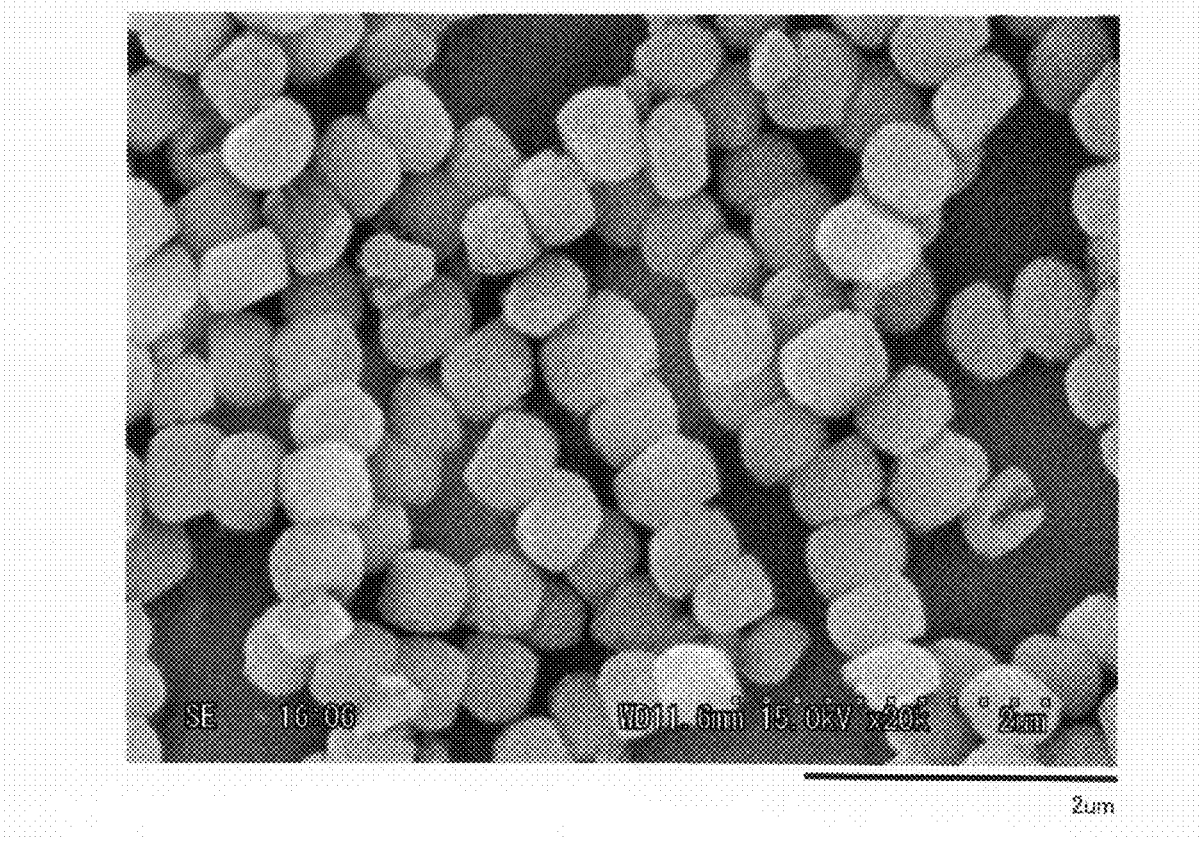
FIG. 14 is an SEM photomicrograph of hexagonal particles of Example 1-Q.

FIGS. 6 to 8 are SEM photomicrographs of the particles obtained in Examples of the present invention. Spherical particles are shown in FIG. 6, hexagonal particles are shown in FIGS. 7 and 14, and disk-like particles are shown in FIG. 8.

As one of the measures for specifying the shape of each particle, there are Wadell's circularity and sphericity which have been used in the field of the powder industry. Wadell's sphericity "s" is defined as follows.

$s$=(surface area of ball having the same volume as particle)/(surface area of particle)

As "s" becomes closer to "1", the particle is more spherical. Wadell's circularity "c" is defined as follows.

$c$=(circumferential length of circle having the same area as projection area of particle)/(circumferential length of projection area of particle)

As "c" becomes closer to "1", the particle is more circular.

The spherical shape of the particle in the present invention means that the particle may be like a ball in its SEM photomicrograph, preferably that the above Wadell's sphericity "s" satisfies $0.95 \leq s \leq 1$.

The hexagonal shape of the particle in the present invention means that the particle is like not only a flat equihexagonal pole but also a deformed hexagon in its SEM photomicrograph. The Wadell's circularity "c" of the projection image of the particle when seen from the top surface direction or the under surface direction satisfies $0.88 \leq c < 0.95$ and the ratio "b" of its thickness to (the maximum length of the diagonal line of the hexagon) satisfies preferably $0.05 \leq b \leq 0.8$, more preferably $0.1 \leq b \leq 0.6$.

The disk-like shape of the particle in the present invention means that the particle is like a flat column in its SEM photomicrograph. The Wadell's circularity "c" of the projection image of the particle when seen from the top surface direction or the under surface direction satisfies $0.95 \leq c \leq 1$ and the ratio "d" of its thickness to (the longer diameter of the circle) satisfies preferably $0.05 \leq d \leq 0.8$, more preferably $0.1 \leq d \leq 0.6$.

When the particle is disk-like or hexagonal, the corners forming the shape may be acute or round.

In the present invention, the term "aspect ratio" means the ratio of the short diameter (minimum diameter) to the long diameter (maximum diameter) of a spherical particle or the ratio of the short diameter (minimum diameter or the length of a minimum diagonal line) to the long diameter (maximum diameter or the length of a maximum diagonal line) of the projection image of a hexagonal or disk-like particle when seen from the top surface direction or under surface direction. The aspect ratio of the alunite type compound particle of the present invention preferably satisfies $0.6 \leq$ aspect ratio $\leq 1.0$.

According to the present invention, the alunite type compound particles can be provided in a spherical, hexagonal or disk-like form according to application and purpose, and the particle diameter can be controlled as described above. That is, as for shape, alunite type compound particles having the optimum shape can be provided. For instance, they are provided in a spherical form when used as an anti-blocking agent, in a spherical, hexagonal or disk-like form when used as a filler for semiconductor epoxy sealers, or in a spherical form when used as an adsorbent. As for particle diameter, alunite type compound particles having an optimum particle diameter can be provided according to application and required packing rate. To realize the closest packing, two different types of alunite type compound particles having different average particle diameters may be used in combination.

The alunite type compound particles of the present invention slightly vary in preferred average secondary particle diameter according to particle shape. That is, when the particles are spherical, the average secondary particle diameter of the particles is 0.2 to 6 μm, preferably 0.3 to 2 μm, particularly preferably 0.4 to 1.8 μm. When the particles are disk-like or hexagonal, the average secondary particle diameter is 0.2 to 10 μm, preferably 0.3 to 5 μm, particularly preferably 0.4 to 3 μm.

The alunite type compound particles provided by the present invention keep a uniform particle diameter without secondary agglomeration although they are small in size. As means of evaluating the particle size uniformity, there is widely used a method for expressing the spread of a particle size distribution by the ratio Ds ($D_{75}/D_{25}$) of the particle diameter $D_{75}$ of particles which account for 75% of the total number of particles to the particle diameter $D_{25}$ of particles which account for 25% of the total number of particles from a smaller particle diameter when the particle diameter is plotted on the horizontal axis and the cumulative percentage of particles is plotted on the vertical axis. The value of Ds ($D_{75}/D_{25}$) of the alunite type compound particles of the present invention represents particle size uniformity which cannot be obtained by the technology of the prior art.

That is, the particle size distribution Ds ($D_{75}/D_{25}$) of the alunite type compound particles of the present invention has a preferred range for each particle shape. When the shape of the particles is spherical, Ds is 1 to 1.4, preferably 1 to 1.3, particularly preferably 1.1 to 1.2. When the shape of the particles is disk-like or hexagonal, Ds is 1 to 1.8, preferably 1.01 to 1.7, particularly preferably 1.05 to 1.5.

As means of measuring the particle diameter, the SEM method for measuring based on a SEM photomicrograph is the most reliable. Since this method takes a huge amount of time, a laser diffraction/scattering method, precipitation method and Coulter method (electric resistance method) are generally used as simple methods. The inventors of the present invention have confirmed through experiments that the laser diffraction/scattering method is the most reliable as the values of $D_{75}$, $D_{50}$ and $D_{25}$ obtained by the laser diffraction/scattering method out of these methods are closest to those obtained by the SEM method (the differences between them were smaller than ±10%). In the present invention, the laser diffraction/scattering method was employed to measure the particle diameter using an apparatus which will be described hereinafter.

The method of measuring a particle size distribution (in the case of spherical particles) based on a SEM photomicrograph was conducted as follows.

The long diameters and short diameters of all the spherical particles (50 to several hundreds of particles) observed in one SEM photomicrograph were measured down to 1/50 mm with calipers to obtain the average values of long diameters and short diameters as the particle diameters of the spherical particles, and particle diameters corresponding to cumulative particle diameters $D_{75}$ and $D_{25}$ are obtained from the above particle diameters to calculate Ds=($D_{75}/D_{25}$).

Since the above alunite type compound particles having particle size uniformity are excellent in dispersibility as an additive for resins and rubbers, when a resin or rubber mixed with a conventionally known additive is compared with a resin or rubber mixed with the alunite type compound particles of the present invention, the elongation percentage of the latter is 5 to 10 times larger than that of the former in a tensile test. Thus, the alunite type compound particles can provide flexibility. Since the alunite type compound particles are uniform in particle size, it is possible to manufacture alunite type compound particles which meet the closest packing condition for a semiconductor sealing resin based on Andreasen's equation. The color of a resin kneaded with the alunite type compound particles of the present invention becomes milky-white and the yellowing or whitening of the resin is not observed. Therefore, the alunite type compound particles of the present invention are useful as an additive for resins and rubbers, particularly a filler, anti-blocking agent or ultraviolet and infrared light absorber.

Since the alunite type compound particles of the present invention are insoluble in water and excellent in acid resistance and can keep their basic structure even in a strong acid environment, they are also useful as a filter medium or filter aid for food processing.

The alunite type compound particles of the present invention may be used alone as an absorber for bad-smelling gases or as a deodorant, or may be mixed with a fiber or a resin.

Since the alunite type compound particles of the present invention show excellent dye absorptivity, they are useful as a dye carrier, coloring aid, or color toner external additive for electrophotography.

The alunite type compound particles of the present invention have a unique X-ray diffraction image as compared with conventionally known alunite compounds and similar compounds. The features of this X-ray diffraction image are shown in Table A and Table B below as compared with those of conventionally known alunites.

Table A shows the comparison of X-ray diffraction images of the alunite type compound of Example 1-A of the present invention, sodium alunite disclosed by JCPDS and sodium alunite disclosed by document 1. "JCPDS" stands for the Joint Committee of Powder Diffraction Standards which is the standard XRD database of powder samples.

Table B shows the comparison of X-ray diffraction images of the alunite type compound of Example 1-I of the present invention, potassium alunite disclosed by JCPDS and potassium alunite disclosed by document 5.

It is understood from Table A that the sodium alunite of Example 1-A of the present invention has peaks on both the (104) face and the (021) face and partially differs from the conventionally known sodium alunites in structure. Table B also shows that the potassium alunite of Example 1-A of the present invention partially differs from the conventionally known potassium alunites in structure.

TABLE A

| Item | Type | Face index 110 | 104 | 021 | 113 |
|---|---|---|---|---|---|
| Existence of peak | Alunite compound of document 1 | ○ | ○ | X | ○ |
| | Sodium alunite of No. 41-1467 of JCPDS | ○ | X | ○ | ○ |
| | Alunite type compound of Example 1-A | ○ | ○ | ○ | ○ |
| Relative strength | Alunite compound of document 1 | — | — | — | — |
| | Sodium alunite of No. 41-1467 of JCPDS | 25 | — | 70 | 100 |
| | Alunite type compound of Example 1-A | 20 | 3 | 44 | 100 |
| d-value | Alunite type compound of document 1 | — | — | — | — |
| | Sodium alunite of No. 41-1467 of JCPDS | 3.49 | — | 2.98 | 2.96 |
| | Alunite type compound of Example 1-A | 3.49 | 3.41 | 2.98 | 2.95 |

TABLE B

| Item | Type | Face index 003 | 101 | 012 | 110 | 104 | 113 | 015 | 006 | 107 | 009 | 033 | 303 | 220 | 0210 | 226 |
|---|---|---|---|---|---|---|---|---|---|---|---|---|---|---|---|---|
| Existence of peak | potassium alunite of No. 14-0136 of JCPDS | ○ | ○ | ○ | ○ | X | ○ | X | ○ | ○ | ○ | X | ○ | ○ | ○ | ○ |
| | alkali aluminium sulfate hydroxide of the document 5 | X | ○ | ○ | ○ | X | ○ | X | ○ | ○ | X | ○ | X | X | ○ | X |
| | Alunite type compound of Example 1-I | ○ | X | ○ | X | ○ | X | ○ | ○ | ○ | X | X | ○ | ○ | ○ | ○ |
| Relative strength | potassium alunite of No. 14-0136 of JCPDS | 30 | 14 | 55 | 20 | — | 100 | — | 100 | 80 | 70 | — | 30 | 16 | 35 | 10 |
| | alkali aluminium sulfate hydroxide of the document 5 | — | 10 | 49 | 29 | — | 100 | — | 3 | 13 | — | 19 | — | — | 1 | — |
| | Alunite type compound of Example 1-I | 13 | — | 29 | — | 35 | — | 100 | 4 | 13 | — | — | 28 | 20 | 4 | 8 |

TABLE B-continued

| Item | Type | Face index | | | | | | | | | | | | | | |
|---|---|---|---|---|---|---|---|---|---|---|---|---|---|---|---|---|
| | | 003 | 101 | 012 | 110 | 104 | 113 | 015 | 006 | 107 | 009 | 033 | 303 | 220 | 0210 | 226 |
| d-value | potassium alunite of No. 14-0136 of JCPDS | 5.77 | 5.72 | 4.96 | 3.49 | — | 2.99 | — | 2.89 | 2.29 | 1.93 | — | 1.90 | 1.75 | 1.50 | 1.49 |
| | alkali aluminium sulfate hydroxide of the document 5 | — | 5.72 | 4.96 | 3.51 | — | 2.99 | — | 2.86 | 2.27 | — | 1.91 | — | — | 1.49 | — |
| | Alunite type compound of Example 1-I | 5.71 | — | 4.96 | — | 3.49 | — | 2.98 | 2.88 | 2.28 | — | — | 1.90 | 1.75 | 1.51 | 1.49 |

A description is subsequently given of the process for manufacturing the alunite type compound particles of the present invention.

The alunite type compound particles of the present invention are obtained by adding a hydroxide solution of a cation selected from the second group to a mixture solution of a compound of an element based on a cation (first group) having an ion radius of less than 0.8 Å and a coordination number of 6, which is water-soluble at a pH of 1 to 7, and a sulfate of the above cation (second group) having an ion radius of 0.8 to 1.5 Å to ensure that the alkali equivalent ratio becomes 0.6 to 1.2, preferably 0.8 to 1.1 and carrying out a reaction by heating.

Stated more specifically, the alunite type compound particles can be obtained by adding a hydroxide solution of at least one cation excluding $H_3O^+$, selected from the group (second group) consisting of $Na^+$, $K^+$, $NH_4^+$ and $H_3O^+$ to a mixture solution of a compound of an element based on at least one cation including at least $Al^{3+}$, selected from the group (first group) consisting of $Al^{3+}$, $Cu^{2+}$, $Zn^{2+}$, $Ni^{2+}$, $Sn^{4+}$ and $Zr^{4+}$, which is water-soluble at a pH of 1 to 7, and a sulfate of the above cation excluding $H_3O^+$, selected from the second group to ensure the alkali equivalent ratio becomes 0.6 to 1.1, preferably 0.7 to 1.0, particularly preferably 0.8 to 0.9, and carrying out a reaction by heating.

The process for manufacturing the above alunite type compound particles of the present invention is characterized in that the reaction is carried out by controlling the alkali equivalent ratio to 1.1 or less, preferably 1.0 or less when the theoretical ratio is 1. The preferred range of the alkali equivalent ratio slightly differs according to the types of the metals of the first group.

That is, though the metals of the first group must include $Al^{3+}$, the range of the alkali equivalent ratio slightly differs according to whether the group include $Ti^{4+}$ or not. Thus, the alunite type compound particles of the present invention are manufactured by the following processes according to whether the metals of the first group include $Ti^{4+}$ or not.

A first process for manufacturing alunite type compound particles, comprising the steps of adding a hydroxide solution of at least one cation excluding $H_3O^+$, selected from the group (second group) consisting of $Na^+$, $K^+$, $NH_4^+$ and $H_3O^+$ to a mixture solution of a compound of an element based on at least one cation including $Al^{3+}$ as an essential component, selected from the group (first group) consisting of $Al^{3+}$, $Cu^{2+}$, $Zn^{2+}$, $Ni^{2+}$, $Sn^{4+}$ and $Zr^{4+}$, which is water-soluble at a pH of 1 to 7, and a sulfate of the above cation selected from the second group to ensure that the alkali equivalent ratio becomes 0.6 to 1.1, preferably 0.7 to 1.0, particularly preferably 0.8 to 0.9, and carrying out a reaction by heating.

A second process for manufacturing alunite type compound particles, comprising the steps of adding a hydroxide solution of at least one cation excluding $H_3O^+$, selected from the group (second group) consisting of $Na^+$, $K^+$, $NH_4^+$ and $H_3O^+$ to a mixture solution of compounds of elements based on at least two cations including $Al^{3+}$ and $Ti^{4+}$ as essential components, selected from the group (first group) consisting of $Al^{3+}$, $Cu^{2+}$, $Zn^{2+}$, $Ni^{2+}$, $Sn^{4+}$, $Zr^{4+}$ and $Ti^{4+}$, which are water-soluble at a pH of 1 to 7, and a sulfate of the above cation selected from the second group to ensure that the alkali equivalent ratio becomes 0.6 to 1.2, preferably 0.7 to 1.1, particularly preferably 0.8 to 1.0, and carrying out a reaction by heating.

In the above first and second manufacturing processes, the molar ratio of the sulfate of the second group (for example, sodium sulfate) to the metal salt of the first group (for example, aluminum sulfate) is desirably at least 0.3, advantageously at least 0.4. The upper limit of this molar ratio is 6.0, preferably 5.0, particularly preferably 3.0. This molar ratio is industrially advantageously 2 or less. It is obvious from Table C which will be given hereinafter that the above molar ratio is preferably at least 0.3.

The results of Table C below show the influence of the amount of a catalyst ($Na_2SO_4$) when an aqueous solution of sodium hydroxide [NaOH] is reacted with a mixture solution of aluminum sulfate [$Al_2(SO_4)_3$] and sodium sulfate [$Na_2SO_4$] as the catalyst.

TABLE C

| | Reaction molar ratio | | |
|---|---|---|---|
| Particle shape | 1.0 | 0.667 | 0.333 |
| Average particle diameter (μm) | 1.423 | 1.607 | 1.301 |
| $D_{75}/D_{25}$ | 1.10 | 1.14 | 1.15 |
| Shape | spherical | spherical | spherical |
| Shape uniformity | ⊚ | ⊚ | ○ |

Shape uniformity
⊚: uniform
○: almost uniform

According to other experiments conducted by the inventors of the present invention, when aluminum sulfate as a metal sulfate of the first group and a zinc compound were used in combination in the first and second manufacturing processes, the reaction fully proceeded even in a case where the molar ratio of a salt of the second group (for example, sodium sulfate) as a catalyst was 0.3 or less, and the reaction proceeded and the particles of interest could be obtained even in an extreme case where no catalyst was used (the above molar ratio is "0") (see Example 1-O).

An example of the process for manufacturing the alunite type compound particles of the present invention is given below.

Alunite type compound particles can be formed by adding an aqueous solution of sodium hydroxide to a mixture solution of aluminum sulfate and sodium sulfate as a catalyst to ensure that the alkali equivalent ratio becomes about 0.85 and carrying out a reaction by heating at 170° C. for 2 hours. If necessary, the formed alunite type compound particles are filtered, rinsed and dried to obtain hydrous powders of the alunite type compound particles.

In the manufacturing process of the present invention, it is not necessary to always monitor pH during the reaction and control pH to ensure particle size uniformity unlike the process of the prior art. Also it is not necessary to grind or classify the particles after the end of the reaction because particles uniform in size and shape are obtained at the end of the reaction.

When aluminum sulfate is reacted with a mixture solution of salts containing two different cations selected from the second group and an alkali hydroxide in the above synthetic example, a solid solution of alunite type compound particles can be obtained.

When a mixture solution of compounds of elements based on at least two cations including $Al^{3+}$ elected from the first group, which are water-soluble at a pH of 1 to 7, for example, a mixture solution of aluminum sulfate and titanium sulfate is reacted with an mixture solution of sulfates including at least two different cations selected from the second group and an alkali hydroxide under heating in the same synthetic example, a solid solution of alunite type compound particles which differs from the above solid solution in composition can be produced.

When the concentration of a metal cation other than $Al^{3+}$ elected from the first group is set to a predetermined value or more, a hydrolysate of the metal salt can be deposited on the surfaces of the alunite type compound particles. The synthesis of alunite type compound particles and the surface modification of the particles can be carried out at the same time in this process unlike the process of the prior art in which a hydrolysate of a metal salt of the first group is deposited on the surface of an alunite type compound by adding alunite type compound particles and a base such as sodium hydroxide to an aqueous solution of a salt of a metal cation selected from the first group. Therefore, the above process is efficient and binding to the surface is strong.

It is needless to say that a hydrolysate of a metal salt can be supported on the surfaces of the alunite type compound particles by the above process of the prior art.

In the present invention, some of $(SO_4^{2-})_y$ in the formula (I), specifically 1/10 or less of y moles can be substituted by other inorganic acid ion. The particle shape and particle size uniformity of the present invention can be maintained by substitution, thereby achieving the object of the present invention. If necessary, alunite type compound particles having a new shape, for example, rectangular parallelpiped shape can be obtained by substituting more than 1/10 of y moles.

Examples of the inorganic acid ion include $SO_3^{2-}$, $PO_4^{3-}$, $HPO_3^{2-}$, $CO_3^{2-}$, $NO_3^-$, $SiO_4^{4-}$ and $BO_3^{3-}$.

As means of substituting some or all of $(SO_4^{2-})_y$ with the above inorganic acid ion, a salt including the inorganic acid ion is preferably used in place of the sulfate in the first and second manufacturing processes.

In the manufacture of the alunite type compound particles of the present invention, the shape of the obtained particles can be selectively controlled by a combination and types of cations of the first group in the above manufacturing processes. That is, when the cations of the first group are only aluminum ions, spherical particles are obtained and when a combination of aluminum ion and nickel ion, tin ion or titanium ion is used, spherical particles are also obtained.

Meanwhile, when a combination of aluminum ion and zinc ion is used, disk-like particles are obtained. Further, when a combination of aluminum ion and copper ion or zirconium ion as cations is used, hexagonal particles are obtained.

The relationship between the shape of the particle and the type of the cation will be explained based on the above general formula (I). When M' is not existent (X is "0"), the particle becomes spherical and when M' is $Ni^{2+}$, $Sn^{4+}$ or $Ti^{4+}$, the particle also becomes spherical. When M' is $Zn^{2+}$, the particle becomes disk-like and when M' is $Cu^{2+}$, or $Zr^{4+}$, the particle becomes hexagonal.

The manufacturing conditions and features of the obtained particles will be described in detail with reference to FIGS. 1 to 4 and Table 4.

Figure 1:
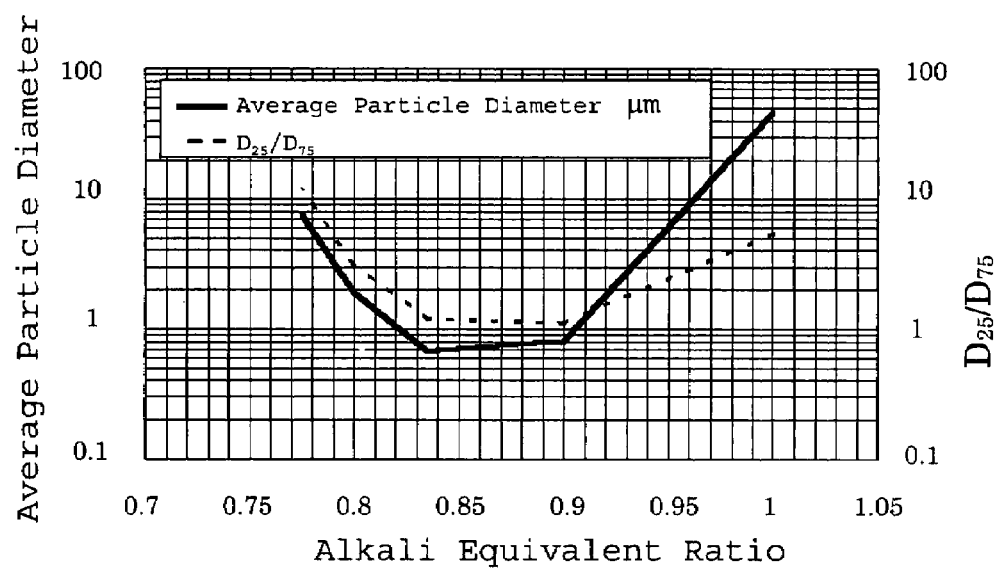
FIG. 1 is a graph showing the relationship between alkali equivalent ratio and average particle diameter or $D_{75}/D_{25}$ when the reaction temperature is 95° C. in the synthesis of alunite type compound particles.

FIG. 1 shows the relationship between alkali equivalent ratio and average particle diameter or $D_{75}/D_{25}$ when the reaction temperature is set to 95° C. for the synthesis of $Na_{0.96}Al_3(SO_4)_{1.92}(OH)_{6.12}\cdot0.63H_2O$.

According to FIG. 1, when the reaction is carried out at 95° C. and 0.835≦alkali equivalent ratio≦0.9, spherical sodium alunite type compound particles having an average particle diameter of 0.75 to 0.8 μm and $1<D_{75}/D_{25}<1.2$ are obtained.

Figure 2:
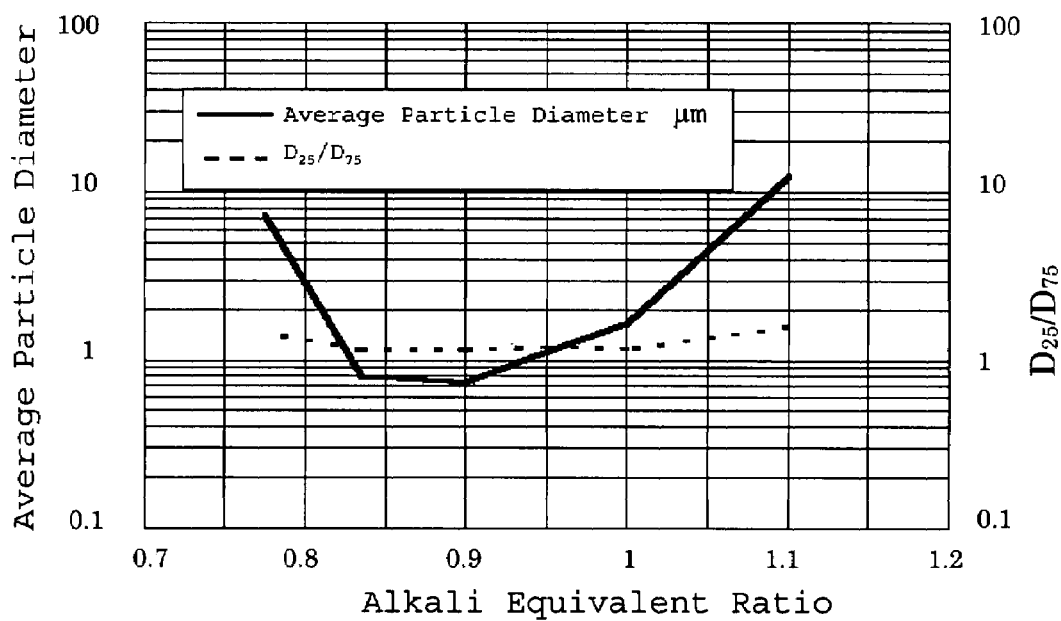
FIG. 2 is a graph showing the relationship between alkali equivalent ratio and average particle diameter or $D_{75}/D_{25}$ when the reaction temperature is 170° C. in the synthesis of alunite type compound particles.

FIG. 2 shows the relationship between alkali equivalent ratio and average particle diameter or $D_{75}/D_{25}$ when the reaction temperature is set to 170° C. for the synthesis of $Na_{0.96}Al_3(SO_4)_{1.92}(OH)_{6.12}\cdot0.63H_2O$.

According to FIG. 2, when the reaction is carried out at 170° C. and 0.835≦alkali equivalent ratio≦0.9, spherical sodium alunite type compound particles having an average particle diameter of 0.70 to 0.8 μm and $1<D_{75}/D_{25}<1.2$ are obtained.

Table C above shows the results of comparison in shape among the particles formed by changing the molar ratio of $[Na_2SO_4]$ to $[Al_2(SO_4)_3]$ to 0.333, 0.667 and 1.0 for the synthesis of $Na_{0.96}Al_3(SO_4)_{1.92}(OH)_{6.12}\cdot0.63H_2O$. In this reaction, only aluminum sulfate was used as the metal compound of the first group.

According to Table C, spherical alunite type compound particles which are uniform in shape and size are formed by controlling the above molar ratio to 0.3 or more.

Figure 3:
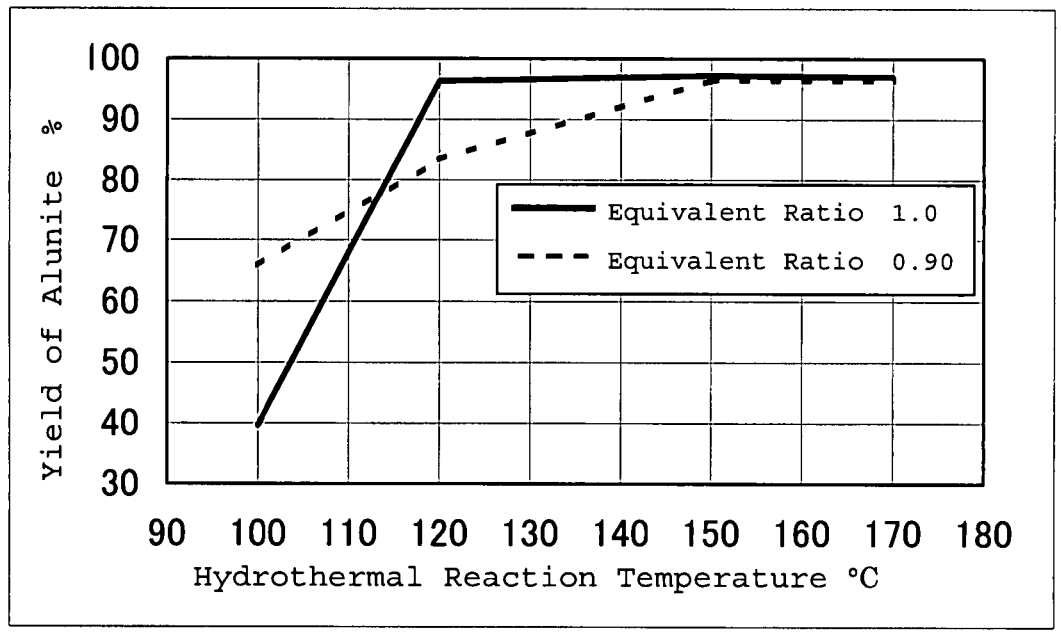
FIG. 3 shows the relationship between hydrothermal reaction temperature and the yield of alunite type compound particles when the alkali equivalent ratio is 1.0 and 0.9 in the synthesis of alunite type compound particles.

FIG. 3 shows the relationship between hydrothermal reaction temperature and the yield of alunite type compound particles when the alkali equivalent ratio is 1.0 and 0.9 in the synthesis of $Na_{0.96}Al_3(SO_4)_{1.92}(OH)_{6.12}\cdot0.63H_2O$. FIG. 3 shows that when the hydrothermal reaction temperature is 120° C. or higher, the yield is 90% or more at an alkali equivalent ratio of 1.0 and 85% or more at an alkali equivalent ratio of 0.9.

Figure 4:
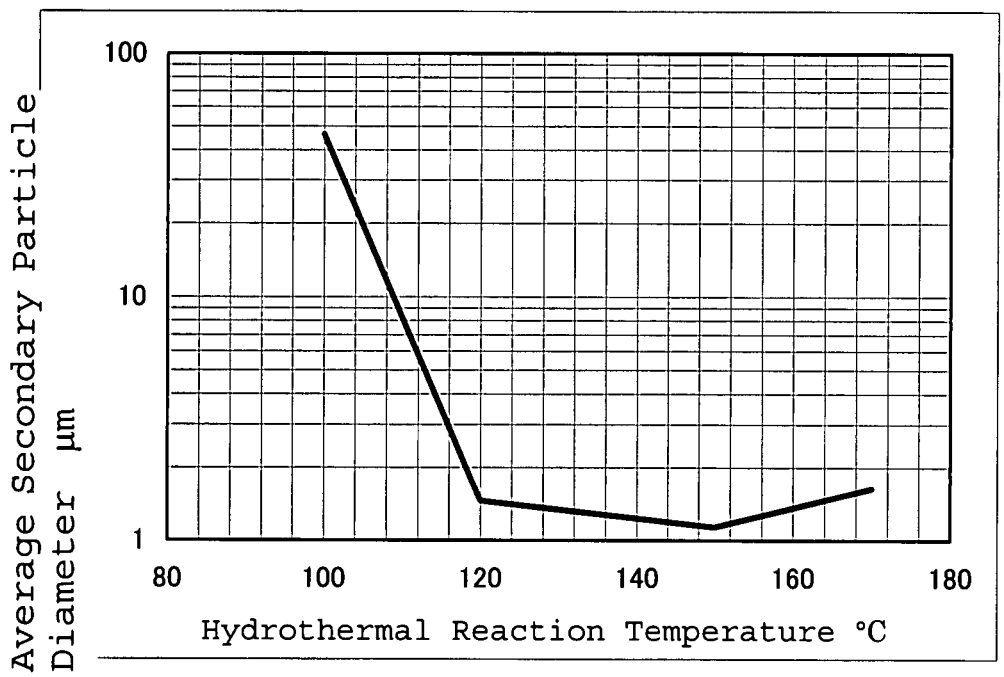
FIG. 4 shows the relationship between hydrothermal reaction temperature and the average secondary particle diameter of alunite type compound particles when the alkali equivalent ratio is 1.0 in the synthesis of alunite type compound particles.

FIG. 4 shows the relationship between hydrothermal reaction temperature and the average secondary particle diameter of alunite type compound particles when the alkali equivalent is 1.0 in the synthesis of $Na_{1.00}Al_3(SO_4)_{2.00}(OH)_6\cdot0.63H_2O$.

FIG. 4 shows that when the hydrothermal reaction temperature is 120 to 150° C., alunite type compound particles having an average secondary particle diameter of 1.2 μm or less are obtained at an alkali equivalent ratio of 1.0.

As obvious from FIG. 3 and FIG. 4, the thermal reaction in the present invention is preferably carried out at 90 to 250° C. The temperature range is more preferably 120 to 170° C.

When the reaction temperature is lower than 90° C., fine particles are not obtained, the reaction rate becomes very low, and the yield drops. On the contrary, when the reaction temperature is higher than 250° C., special equipment is required, which is industrially unpreferred. The reaction may be carried out in an autoclave in a sealed condition or open condition.

When the alunite type compound particles of the present invention are used in application fields where anti-block properties are required, they have a BET specific surface area of preferably 0.1 to 30 m$^2$/g, more preferably 2 to 10 m$^2$/g. When the alunite type compound particles are used as an adsorbent or carrier, they have a BET specific surface area of preferably 0.5 to 300 m$^2$/g, more preferably 2 to 250 m$^2$/g.

Since a support composition supporting the following inorganic oxide or ceramic by the alunite type compound particle of the present invention in accordance with a conventionally known method has higher fluidity and dispersibility in a resin than when the inorganic acid or ceramic is directly added to a resin and high acid resistance, it is suitable for use as a carrier for various additives, that is, thermoconductivity providing agent carrier, conductivity providing agent, adsorbent, for example, water adsorbent or moisture control agent, volatile organic component (VOC) removing agent, dye carrier, heat insulating material for agricultural films, ultraviolet/infrared light absorber for cosmetics or ultraviolet deterioration preventing agent for rubbers. Examples of the inorganic oxide, metal and ceramic include silica, aluminum oxide, antimony oxide, tin oxide, cupic oxide, manganese dioxide, zirconium oxide, zinc oxide, titanium oxide, antimony doped tin oxide, tin doped indium oxide, ytterbium oxide, tungsten trioxide, barium oxide, magnesium oxide, calcium oxide, titanium nitride, chromium nitride, alkali metal silicates, mica, zeolite and imogolit.

A predetermined function can be provided to the alunite type compound particle carrier composition supporting the above material by kneading a resin according to application or by forming a film on another substrate material such as alloy, ceramic or carbon by CVD, plasma CVD or PVD.

Although the alunite type compound particle of the present invention can be used directly as an additive having high dispersibility, the dispersibility in a resin or rubber of the particle can be further improved by modifying its surface with at least one surface treating agent selected from the group consisting of a higher fatty acid, anionic surfactant, phosphate, coupling agent or ester of a polyhydric alcohol and a fatty acid. Preferred examples of the surface treating agent are given below: higher fatty acids having 10 or more carbon atoms, such as stearic acid, erucic acid, palmitic acid, lauric acid and behenic acid, and alkali metal salts of these higher fatty acids; sulfates of higher alcohols such as stearyl alcohol and oleyl alcohol; anionic surfactants such as sulfates of a polyethylene glycol ether, amido-bonded sulfates, ester-bonded sulfates, ester-bonded sulfonates, amido-bonded sulfonates, ether-bonded sulfonates, ether-bonded alkylaryl sulfonates, ester-bonded alkylaryl sulfonates and amido-bonded alkylaryl sulfonates; phosphates of acid and alkali metal salts and amine salts of mono- or-diesters of orthophosphoric acid and oleyl alcohol or stearyl alcohol or mixtures thereof; silane coupling agents such as γ-(2-aminoethyl)aminopropyltrimethoxysilane, γ-(2-aminoethyl)aminopropylmethyldimethoxysilane, n-β-(n-vinylbenzylaminoethyl)-γ-aminopropyltrimethoxysilane.hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropylmethyltrimethoxysilane, hexamethyldisilazane, γ-anilinopropyltrimethoxysilane, vinyltrimethoxysilane, octadecyldimethyl[3-(trimethoxysilyl)]ammonium chloride, γ-chloropropylmethyldimethoxysilane, γ-mercaptopropylmethyldimethoxysilane, methyltrichlorosilane, dimethyldichlorosilane, trimethylchlorosilane, vinyltrichlorosilane, vinyltriethoxysilane, vinyltris(β-methoxyethoxy)silane, β-(3,4-epoxycyclohexyl)ethyltrimethoxysilane, γ-glycidoxypropylmethylethoxysilane, γ-glycidoxypropyltriethoxysilane, γ-methacryloxypropylmethyldimethoxysilane, γ-methacryloxypropylmethyldiethoxysilane, γ-methacryloxypropylmethyltriethoxysilane, n-βaminoethyl)γ-aminopropylmethyldimethoxysilane, n-β(aminoethyl)γ-aminopropylmethyltrimethoxysilane, n-β(aminoethyl)γ-aminopropylmethyltriethoxysilane, γ-aminopropyltrimethoxysilane, γ-aminopropyltriethoxysilane, n-phenyl-γ-aminopropyltrimethoxysilane, γ-glycidoxypropyltrimethoxysilane and γ-methacryloxypropyltrimethoxysilane; titanate-based coupling agents such as isopropyltriisostearoyl titanate, isopropyltris(dioctylpyrophosphate)titanate, isopropyltri(n-aminoethyl-aminoethyl) titanate, isopropyltridecylbenzenesulfonyl titanate, tetraoctylbis(ditridecylphosphate)titanate, bis (dioctylpyrophosphate)oxyacetate titanate, isopropyltridodecylbenzenesulfonyl titanate, tetraisopropyl-bis(dioctylphosphite)titanate, tetra(2,2-diallyloxymethyl-1-butyl)bis-(ditridecyl)phosphite titanate, bis(dioctylpyrophosphate) ethylene titanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, dicumylphenyloxyacetate titanate and diisostearoylethylene titanate; aluminum-based coupling agents such as acetoalkoxyaluminum diisopropyrate; triphenyl phosphite, diphenyl.tridecyl phosphite, phenyl ditridecyl phosphite, tri.nonylphenyl phosphite, 4,4'-butylidene-bis(3-methyl-6-t-butylphenyl)-ditridecyl phosphite, trilauryl thiophosphite, esters of polyhydric alcohols and fatty acids such as glycerin monostearate and glycerin monooleate.

As for the surface treatment of the alunite type compound particle with the above surface treating agent, the surface treating agent may be added after any one of the thermal reaction, filtering, rinsing and drying steps in the manufacturing process of the alunite type compound particle in which the alunite type compound particle is formed by a thermal reaction, filtered, rinsed and dried. When an inorganic oxide, metal or ceramic is supported by the alunite type compound particle, the alunite type compound particle may be surface treated after it supports the above substance. When it is kneaded with a rubber or resin, the surface treating agent may be added during kneading. Surface treatment may be carried out by a conventionally known process such as a wet or dry process.

The amount of the surface treating agent is 0.01 to 10 parts by weight, preferably 0.05 to 5 parts by weight based on 100 parts by weight of the alunite type compound particle.

The alunite type compound particle of the present invention is caused to support an inorganic oxide, metal or ceramic directly or after it is surface treated and then can be mixed with an organic polymer compound listed below. Examples of the organic polymer compound include resins such as resol and novolak type phenolic resins, melamine resin, melamine-urea co-condensation resin, melamine-benzoguanamine co-condensation resin, melamine-phenolic resin, bisphenol A type epoxy resin, brominated epoxy resin, bisphenol F type epoxy resin, novolak type epoxy resin, alicyclic epoxy resin, glycidylamine type epoxy resin, glycidyl ester type epoxy resin, heterocyclic epoxy resin, urea resin, urea-formaldehyde-furfuryl alcohol-based resin, unsaturated polyester resin, silicone resin, polyurethane, vinyl chloride, vinyl chloride-ethylene copolymer, vinyl chloride-vinyl acetate copolymer, vinylidene chloride copolymer, polyethylene, polyethyleneimine, polyethylene glycol, polyethylene terephthalate, poly(ethylene-chlorotrifluoroethylene), acrylic resin, polyethylene naphthalate, polybutylene terephthalate, aliphatic polyketone, polystyrene, ABS resin, polypropylene, polyamide 6, polyamide 6-6, polyamide 6t, polyamide MXD6, polyacetal, polyester, polycarbonate, modified polyphenylene ether, polyarylate, polyether imide, polyether sulfone, polyamide-imide, polyphenylene sulfide and liquid crystalline polyester, and alloys of resins selected from these; synthetic rubbers such as chloroprene rubber, styrene butadiene rubber, butyl rubber, ethylene propylene rubber, nitrile rubber, chlorosulfonated polyethylene rubber, urethane rubber, silicone rubber, fluorine rubber, polyisoprene rubber and butadiene rubber; synthetic fibers such as nylon, vinylon, acrylic fiber and rayon; natural organic polymers such as cellulose, alginic acid, starch, protein and collagen, natural resins (shellac, dammar, amber, copal, rosin, etc.); and semi-synthetic polymers such as cellulose-based resins (cellulose acetate, cellulose nitrate, cellulose acetate butyrate, etc.), casein plastics and soybean protein plastics.

The alunite type compound particles can be added to a synthetic polymer at a high density and the resulting composition can retain the mechanical, optical and other properties of the synthetic polymer before addition. Therefore, it can be said that a combination of the alunite type compound particles and the synthetic polymer is particularly preferred.

The amount of the alunite type compound particles of the present invention added to the above organic polymer compound as an additive is preferably 0.5 to 90 parts by weight, more preferably 1 to 80 parts by weight based on 100 parts by weight of the organic polymer compound. When the amount is smaller than 0.5 part by weight, the effect of the additive as described in the Effect of the Invention cannot be fully obtained and when the amount is larger than 90 parts by weight, the effect is not further improved. The amount of the alunite type compound particles as a filler is preferably 0.5 to 100 parts by weight, more preferably 1 to 95 parts by weight. When the amount is smaller than 0.5 part by weight, the effect of the filler as described in the Effect of the Invention is unsatisfactory and when the amount is larger than 100 parts by weight, the effect is not further improved.

EXAMPLES

The following examples are provided for the purpose of further illustrating the present invention but are in no way to be taken as limiting. All the chemicals used in the following examples are reagents of first grade manufactured by Wako Pure Chemical Industries, Ltd. unless stated otherwise.

Analyzing methods, testing methods and apparatuses used in Examples will be described hereinbelow.

(1) Refractive Index method: 5 mg of a sample powder was added to 5 ml of a suitable organic solvent and dispersed with ultrasonic waves for 10 minutes, and a transparent portion of the obtained dispersion was spread over the main prism surface to form a thin film so as to obtain the refractive index of the film.

apparatus: Abbe's refractometer (of ATAGO Co., Ltd.)

(2) SEM method: acceleration voltage of 15 kV, working distance of 10 mm, magnification of 2,000×, 10,000× and 20,000× apparatus: S-3000N (of Hitachi, Ltd.)

(3) Differential Thermal Analysis method: air atmosphere: 100 ml/min; control sample: α-alumina; temperature elevation rate: 10° C./min apparatus: THERMAL ANALYSIS STATION TAS100; TG8110 (of Rigaku Corporation)

(4) IR Analysis method: KBr briquette method apparatus: Fourier transformation infrared spectrophotometer FT-710 (of HORIBA Co., Ltd.)

(5) Analysis of Particle Size Distribution method: A sample powder was added to 0.2% of sodium hexametaphosphate (concentration: 1 wt %) and dispersed with ultrasonic waves for 3 minutes to measure its particle diameter.

apparatus: LA-910 (of HORIBA Co., Ltd.)

(6) BET Analysis of Specific Surface Area method: 3-point method apparatus: NOVA2000 high-speed specific surface area/pore distribution measuring instrument (of Yuasa Ionics Co., Ltd.)

(7) X-Ray Diffraction Analysis method: CU—Kα, angle (θ): 5 to 65, step: 0.02, scanning speed: 4, tube voltage: 40 kV, tube current: 20 mV apparatus: RINT2200V X-ray diffraction system (of Rigaku Corporation)

(8) Dye Adsorption Test method: 2 g of a sample and 10 mg of a dye were added to 150 ml of pure water and stirred fully so as to analyze the concentration of the dye at the initial stage and after 15 hours.

$$\text{Adsorption rate} = (A-B)/A \times 100\%$$

A: initial content of dye in solution

B: content of dye after 15 hours of adsorption apparatus: HITACHI 150-20 Spectrophotometer and Data Processor (9) Analysis of Oxygen Content apparatus: JSM6300 Scanning Microscope

(10) Bad-Smelling Gas Adsorption Test ammonia $NH_3$ concentration of standard gas: 197 ppm 1 liter of ammonia ($NH_3$) was introduced into 50 ml of pure water to measure the amount of the residual gas from the calibration curve of pH.

trimethylamine $(CH_3)_3N$ concentration of standard gas: 198 ppm amount of introduction: 1.0 ml temperature of sample vaporizing chamber: 130° C.
   column: Diglycerol+Tep+KOH (15+15+2%) Chromosorb W 80/100, AW-DMCS 3.1 m×3.2 mm
   column temperature: 60° C. (fixed)
   carrier gas: $N_2$
   flow rate: 50 ml/min
   pressure: 130 kPa detector: FID; hydrogen gas pressure: 50 kPa; air pressure: 50 kPa; temperature of detector: 130° C. iso-valeric acid $(CH_3)_2CHCOOH$ concentration of standard gas: 20.0 ppm introduction amount: 1.0 ml temperature of sample vaporizing chamber: 250° C.

column: DB-WAX 30 m×0.32 mm column temperature: 220° C. (fixed)

carrier gas: He; flow rate: 2.3 ml/min; pressure: 50 kPa detector: FID; hydrogen gas pressure: 50 kPA; air pressure: 50 kPa; temperature of detector: 250° C.

(11) method of measuring the elongation percentage of resin method: A No. 1 specimen was prepared based on a plastic tensile test method (JIS K 7113) and the testing speed was D (50±5 mm/min).

apparatus: TENSILON/UTM-1-2500 and SS-207D-UA (of TOYO BALDWIN Co., Ltd.)

(12) Method of Measuring Water Absorptivity method: Water absorptivity was measured in accordance with JIS-K6911 5.26.1 method.

apparatus: AGX-326 thermo-hydrostat of Advantec Toyo Co., Ltd.

Example 1 Synthesis of Alunite Type Compound Particles

Example 1-A

Figure 5:
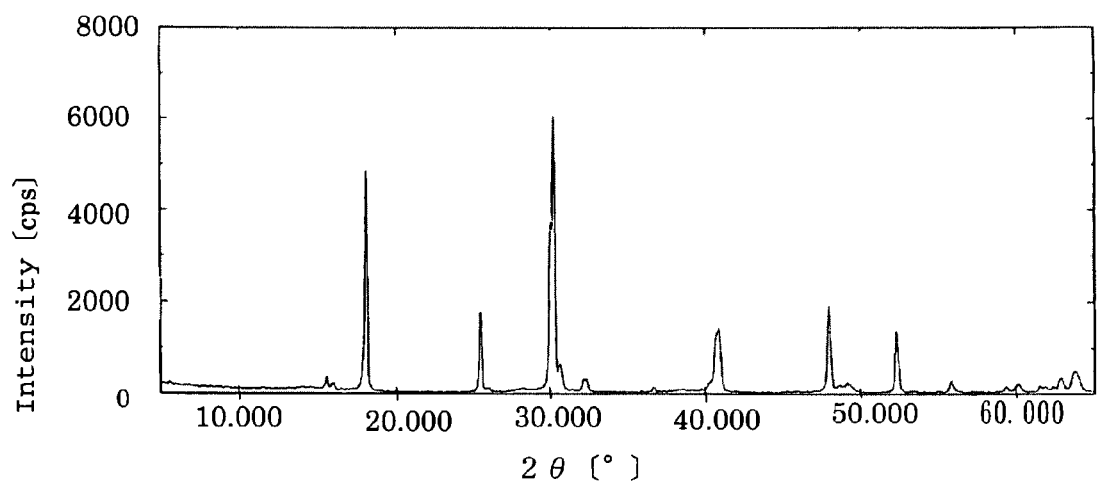
FIG. 5 is an X-ray diffraction diagram of spherical alunite type compound particles of Example 1-A.

Synthesis of $Na_{0.96}Al_3(SO_4)_{1.92}(OH)_{6.12} \cdot 0.63H_2O$ 127 ml of an aqueous solution of aluminum sulfate having a concentration of 1.025 mol/l and 18.46 g (0.13 mol) of sodium sulfate were added to deionized water to prepare 500 ml of a solution, and 154 ml of 3.382 N sodium hydroxide solution was injected into the above solution under agitation at room temperature over about 1 minute (alkali equivalent ratio: 1.0). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1. An X-ray diffraction image of the particles is shown in FIG. 5.

Example 1-B

Synthesis of $Na_{1.12}Al_3(SO_4)_{2.17}(OH)_{5.78} \cdot 0.94H_2O$

Alunite type compound particles were synthesized in the same manner as in Example 1-A except that the alkali equivalent ratio was changed to 0.95. The results are shown in Table 1.

Example 1-C

Synthesis of $Na_{1.14}Al_3(SO_4)_{2.30}(OH)_{5.54} \cdot 1.3H_2O$

Alunite type compound particles were synthesized in the same manner as in Example 1-A except that the alkali equivalent ratio was changed to 0.90. The results are shown in Table 1.

Example 1-D

Synthesis of $Na_{1.11}Al_3(SO_4)_{2.33}(OH)_{5.45} \cdot 1.9H_2O$

Alunite type compound particles were synthesized in the same manner as in Example 1-A except that the alkali equivalent ratio was changed to 0.835. The results are shown in Table 1. FIG. 6 shows an SEM photomicrograph of the synthesized spherical alunite type compound particles.

Example 1-E

Synthesis of $Na_{1.06}Al_3(SO_4)_{2.35}(OH)_{5.36} \cdot 2.58H_2O$ 127 ml of an aqueous solution of aluminum sulfate having a concentration of 1.025 mol/l and 18.46 g (0.13 mol) of sodium sulfate were added to deionized water to prepare 500 ml of a solution, and 139 ml of 3.382 N sodium hydroxide solution was injected into the above solution under agitation at room temperature over about 1 minute (alkali equivalent ratio: 0.9). After another 20 minutes of agitation, the resulting solution was transferred to an autoclave to carry out a hydrothermal reaction at 95° C. for 2 hours. The reaction solution was cooled to 25° C., filtered, rinsed with 50 ml of water and dried at 105° C. for 22 hours to obtain spherical alunite type compound particles. The characteristic properties of the obtained alunite type compound particles are shown in Table 1.

Example 1-F

Synthesis of $Na_{1.09}(Al_{2.80}Zn_{0.20})(SO_4)_{2.27}(OH)_{5.35} \cdot 1.33H_2O$ 87 ml of an aqueous solution of aluminum sulfate having a concentration of 1.03 mol/l and 12.78 g (0.09 mol) of sodium sulfate were fed to a 1-liter vessel and deionized water was added to prepare 500 ml of a solution, and 5.53 g of ZnO (commercially available product) powders was added to the above solution under agitation with a homomixer at room temperature. After another 20 minutes of agitation, 47 ml of a 3.385 N sodium hydroxide solution was injected into the obtained solution. After 20 minutes of agitation, the resulting solution was transferred to an autoclave to carry out a hydrothermal reaction at 170° C. for 2 hours. The reaction solution was cooled, filtered, rinsed and dried at 105° C. for 18 hours to obtain disk-like alunite type compound particles.

The characteristic properties of the obtained alunite type compound particles are shown in Table 1.

Example 1-G

Synthesis of $Na_{0.97}Al_3(SO_4)_{2.33}(OH)_{5.31} \cdot 0.62H_2O$

Alunite type compound particles were synthesized in the same manner as in Example 1-E except that the reaction temperature was changed to 200° C. and the reaction time was changed to 1.5 hours. The results are shown in Table 1.

Example 1-H

Synthesis of $Na_{1.09}Al_3(SO_4)_{2.27}(OH)_{5.55} \cdot 1.7H_2O$

Alunite type compound particles were synthesized in the same manner as in Example 1-E except that the reaction temperature was changed to 250° C. and the reaction time was changed to 1 hour. The results are shown in Table 1.

Example 1-I

Synthesis of $K_{1.20}Al_3(SO_4)_{2.20}(OH)_{5.80} \cdot 0.8H_2O$ 127 ml of an aqueous solution of aluminum sulfate having a concentration of 1.025 mol/l and 22.65 g (0.13 mol) of potassium sulfate were added to deionized water to prepare 500 ml of a solution, and 138 ml of 3.382 N sodium hydroxide solution was injected into the above solution under agitation at room temperature over about 1 minute (alkali equivalent ratio: 0.9). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1.

Example 1-J

Synthesis of $[Na_{0.5}K_{0.5}]Al_3(SO_4)_{2.30}(OH)_{5.40} \cdot 0.85H_2O$ 126 ml of an aqueous solution of aluminum sulfate having a concentration of 1.03 mol/l, 9.23 g (0.065 mol) of sodium sulfate and 11.33 g (0.065 mol) of potassium sulfate were added to deionized water to prepare 500 ml of a solution, and 69 ml of 3.385 N sodium hydroxide solution and 69 ml of 3.382 N potassium hydroxide solution were dissolved in deionized water to prepare a 200 ml of a solution which was then injected into the above solution under agitation at room temperature over about 1 minute (alkali equivalent ratio: 0.9). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1.

Example 1-K

Synthesis of $Na_{1.01}[Al_{2.74}Zn_{0.26}](SO_4)_{2.07}(OH)_{5.61} \cdot 2.3H_2O$ 88 ml of an aqueous solution of aluminum sulfate having a concentration of 1.025 mol/l, 5.53 g of zinc oxide and 12.78 g (0.09 mol) of sodium sulfate were added to deionized water to prepare 500 ml of a solution, and 64 ml of 3.382 N sodium hydroxide solution was injected into the above solution under agitation at room temperature over about 1 minute. After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain disk-like alunite type compound particles. The characteristic properties of the obtained alunite type compound particles are shown in Table 1 and an SEM photomicrograph of the composition particle is shown in FIG. 8.

Example 1-L

Synthesis of $Na_{0.96}[Al_{2.77}Ni_{0.23}](SO_4)_{2.04}(OH)_{5.65} \cdot 1.33H_2O$ 87 ml of an aqueous solution of aluminum sulfate having a concentration of 1.03 mol/l, 5.67 g (0.02 mol) of nickel sulfate and 12.78 g (0.09 mol) of sodium sulfate were added to deionized water to prepare 500 ml of a solution, and 106 ml of 3.385 N sodium hydroxide solution was injected into the above solution under agitation at room temperature over about 1 minute (alkali equivalent ratio: 0.9). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1.

Example 1-M

Synthesis of $Na_{0.96}Al_3(SO_4)_{1.92}(OH)_{6.13} \cdot 0.63H_2O$ 127 ml of an aqueous solution of aluminum sulfate having a concentration of 1.025 mol/l and 18.46 g (0.13 mol) of sodium sulfate were added to deionized water to prepare 500 ml of a solution, and 154 ml of 3.382 N sodium hydroxide solution was injected into the above solution under agitation at room temperature over about 1 minute (alkali equivalent ratio: 1.0). After another 24 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1.

Example 1-N

Synthesis of $Na_{0.96}Al_3(SO_4)_{1.92}(OH)_{6.11} \cdot 0.63H_2O$ 127 ml of an aqueous solution of aluminum sulfate having a concentration of 1.025 mol/l and 18.46 g (0.13 mol) of sodium sulfate were added to deionized water to prepare 500 ml of a solution, and 154 ml of 3.382 N sodium hydroxide solution was injected into the above solution under agitation at room temperature over about 10 minutes (alkali equivalent ratio: 1.0). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain spherical alunite type compound particles. The characteristic properties of the obtained alunite type compound particles are shown in Table 1.

Example 1-O

Synthesis of $Na_{1.04}(Al_{2.79}Zn_{0.21})(SO_4)_{2.20}(OH)_{5.43} \cdot 1.1H_2O$ 87 ml of an aqueous solution of aluminum sulfate having a concentration of 1.03 mol/l was fed to a 1-liter vessel and deionized water was added to prepare 500 ml of a solution. 5.53 g of ZnO powders (commercially available product) was added to the above solution under agitation with a homomixer at room temperature and further stirred for 20 minutes, and 61 ml of 3.385 N sodium hydroxide solution was injected into the obtained solution. After another 20 minutes of agitation, the resulting solution was transferred to an autoclave to carry out a hydrothermal reaction at 170° C. for 2 hours. The reaction solution was cooled, filtered, rinsed and dried at 105° C. for 18 hours to obtain disk-like alunite type compound particles. The characteristic properties of the obtained alunite type compound particles are shown in Table 1.

Example 1-P

Synthesis of $K_{1.1}[Al_{2.70}Zn_{0.30}](SO_4)_{2.00}(OH)_{5.65} \cdot 0.35H_2O$ 88 ml of an aqueous solution of aluminum sulfate having a concentration of 1.025 mol/l, 22.12 g of zinc oxide and 62.72 g (0.09 mol) of potassium sulfate were added to deionized water to prepare 500 ml of a solution, and 268 ml of 3.4 N potassium hydroxide solution was injected into the above solution under agitation at room temperature over about 4 minutes. After another 20 minutes of agitation, the resulting solution was transferred to an autoclave to carry out a hydrothermal reaction at 170° C. for 2 hours. The reaction solution was cooled to 25° C., filtered, rinsed and dried at 105° C. for 24 hours to obtain disk-like alunite type compound particles. The characteristic properties of the obtained alunite type compound particles are shown in Table 1.

Example 1-Q

Figure 15:
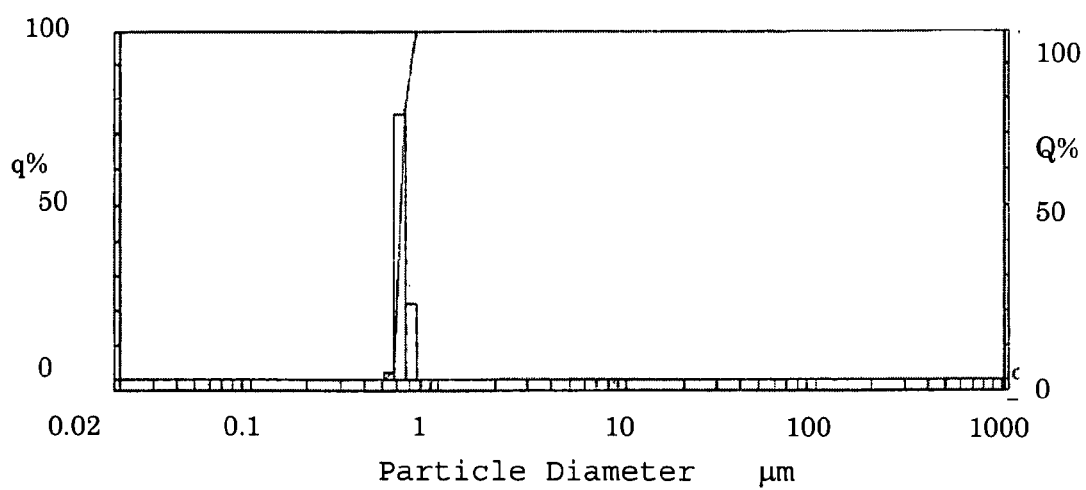
FIG. 15 is a particle size distribution diagram of alunite type compound particles obtained in Example 1-Q.

Synthesis of $Na_{0.96}Al_3(SO_4)_{1.92}(OH)_{6.12} \cdot 0.63H_2O$ 160 l of an aqueous solution of aluminum sulfate having a concentration of 1.037 mol/l and 22.98 g (161.7 mol) of sodium sulfate were added to deionized water to prepare an appropriate amount of a solution, and 172.74 l of 3.37 N sodium hydroxide solution was injected into the above solution under agitation at room temperature over about 2 minutes (alkali equivalent ratio: 1.0). Deionized water was added to prepare 700 l of a reaction solution which was then aged at 40° C. for 4 hours and transferred to an autoclave to carry out a hydrothermal reaction at 170° C. for 3 hours. The stirring speed was set to about ⅓ that of Example 1-A. After the reaction, the reaction solution was cooled to 25° C., filtered, rinsed and dried at 105° C. for 22 hours to obtain hexagonal alunite type compound particles. FIG. 14 shows an SEM photomicrograph and FIG. 15 shows a particle size distribution measured by a laser diffraction method of the obtained alunite type compound particles.

TABLE 1

| Example | Hydroxide Type | Hydroxide Equivalent ratio | Water-soluble compound Type | Reaction conditions Temperature °C. | Reaction conditions Time h | Particle size distribution Average μm | Particle size distribution Standard deviation μm | Particle size distribution Coefficient of variation % | $D_{75}/D_{25}$ |
|---|---|---|---|---|---|---|---|---|---|
| 1-A | NaOH | 1.0 | $Al_2(SO_4)_3$ | 170 | 2 | 1.64 | 0.18 | 11.0 | 1.16 |
| 1-B | NaOH | 0.95 | $Al_2(SO_4)_3$ | 170 | 2 | 1.13 | 0.104 | 9.2 | 1.19 |
| 1-C | NaOH | 0.90 | $Al_2(SO_4)_3$ | 170 | 2 | 0.75 | 0.063 | 8.5 | 1.15 |
| 1-D | NaOH | 0.835 | $Al_2(SO_4)_3$ | 170 | 2 | 0.80 | 0.043 | 5.4 | 1.15 |
| 1-E | NaOH | 0.90 | $Al_2(SO_4)_3$ | 95 | 2 | 0.81 | 0.058 | 7.1 | 1.10 |
| 1-F | NaOH | 0.613 | $Al_2(SO_4)_3ZnO$ | 170 | 2 | 0.69 | 0.054 | 7.9 | 1.19 |
| 1-G | NaOH | 0.90 | $Al_2(SO_4)_3$ | 200 | 1.5 | 1.97 | 0.224 | 11.4 | 1.18 |
| 1-H | NaOH | 0.90 | $Al_2(SO_4)_3$ | 250 | 1 | 0.88 | 0.062 | 7.0 | 1.15 |
| 1-I | KOH | 0.90 | $Al_2(SO_4)_3$ | 170 | 2 | 0.80 | 0.057 | 7.1 | 1.10 |
| 1-J | NaOH KOH | 0.90 | $Al_2(SO_4)_3$ | 170 | 2 | 1.15 | 0.152 | 13.2 | 1.19 |
| 1-K | NaOH | — | $Al_2(SO_4)_3ZnO$ | 170 | 2 | 1.55 | 0.499 | 32.2 | 1.19 |
| 1-L | NaOH | 0.90 | $Al_2(SO_4)_3NiSO_4$ | 170 | 2 | 0.89 | 0.086 | 9.7 | 1.19 |
| 1-M | NaOH | 1.0 | $Al_2(SO_4)_3$ | 170 | 2 | 0.31 | 0.018 | 5.8 | 1.08 |
| 1-N | NaOH | 1.0 | $Al_2(SO_4)_3$ | 170 | 2 | 1.70 | 0.32 | 18.8 | 1.17 |
| 1-O | NaOH | 0.711 | $Al_2(SO_4)_3ZnO$ | 170 | 2 | 2.86 | 0.343 | 11.9 | 1.18 |
| 1-P | KOH | — | $Al_2(SO_4)_3ZnO$ | 170 | 2 | 1.21 | 0.116 | 9.6 | 1.13 |

| Example | BET m²/g | Bulk density g/ml | Refractive index | Particle shape (SEM photomicrograph) | Composition formula |
|---|---|---|---|---|---|
| 1-A | 9.9 | — | — | Spherical | $Na_{0.96}Al_3(SO_4)_{1.92}(OH)_{6.12} \cdot 0.63H_2O$ |
| 1-B | 4.4 | — | — | Spherical | $Na_{1.12}Al_3(SO_4)_{2.17}(OH)_{5.78} \cdot 0.94H_2O$ |
| 1-C | 5.4 | 0.66 | 1.5245 | Spherical | $Na_{1.14}Al_3(SO_4)_{2.30}(OH)_{5.54} \cdot 1.3H_2O$ |
| 1-D | 6.9 | 0.77 | 1.5312 | Spherical (FIG. 6) | $Na_{1.11}Al_3(SO_4)_{2.33}(OH)_{5.45} \cdot 1.9H_2O$ |
| 1-E | 121.1 | — | 1.5229 | Spherical | $Na_{1.06}Al_3(SO_4)_{2.35}(OH)_{5.36} \cdot 2.58H_2O$ |
| 1-F | 97.1 | — | — | Disk-like | $Na_{1.09}[Al_{2.80}Zn_{0.20}](SO_4)_{2.27}(OH)_{5.35} \cdot 1.33H_2O$ |
| 1-G | 61.2 | — | — | Spherical | $Na_{0.97}Al_3(SO_4)_{2.33}(OH)_{5.31} \cdot 0.62H_2O$ |
| 1-H | 45.7 | 0.66 | 1.5339 | Spherical | $Na_{1.09}Al_3(SO_4)_{2.27}(OH)_{5.55} \cdot 1.7H_2O$ |
| 1-I | 11.3 | — | 1.5230 | Spherical | $K_{1.2}Al_3(SO_4)_{2.2}(OH)_{5.8} \cdot 0.8H_2O$ |
| 1-J | 10.6 | — | — | Spherical | $[K_{0.5}Na_{0.5}]Al_3(SO_4)_{2.3}(OH)_{5.4} \cdot 0.85H_2O$ |
| 1-K | 4.4 | 0.65 | 1.5521 | Disk-like (FIG. 8) | $Na_{1.01}[Al_{2.74}Zn_{0.26}](SO_4)_{2.07}(OH)_{5.61} \cdot 2.3H_2O$ |
| 1-L | 4.6 | — | — | Spherical | $Na_{0.96}[Al_{2.77}Ni_{0.23}](SO_4)_{2.04}(OH)_{5.65} \cdot 1.33H_2O$ |
| 1-M | 252.0 | — | — | Spherical | $Na_{0.97}Al_3(SO_4)_{1.92}(OH)_{6.13} \cdot 0.65H_2O$ |
| 1-N | 20.9 | — | — | Spherical | $Na_{0.95}Al_3(SO_4)_{1.92}(OH)_{6.11} \cdot 0.70H_2O$ |
| 1-O | 42 | — | — | Disk-like | $Na_{1.04}[Al_{2.79}Zn_{0.21}](SO_4)_{2.20}(OH)_{5.43} \cdot 1.1H_2O$ |
| 1-P | 3.1 | — | — | Disk-like | $K_{1.1}[Al_{2.70}Zn_{0.30}](SO_4)_{2.00}(OH)_{5.65} \cdot 0.35H_2O$ |

Ex.: Example

Comparative Example 1

Synthesis of $Na_{1.00}Al_3(SO_4)_{2.36}(OH)_{5.28} \cdot 2.87H_2O$ 95 ml of an aqueous solution of aluminum sulfate having a concentration of 1.025 mol/l and 18.46 g (0.13 mol) of sodium sulfate were added to deionized water to prepare 500 ml of a solution, and 66.8 ml of 3.382 N sodium hydroxide solution was injected into the above solution under agitation at room temperature over about 1 minute (alkali equivalent ratio: 0.58). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain an agglomerate of alunite type compound particles. The characteristic properties of the obtained alunite type compound particles are shown in Table 2.

Comparative Example 2

Synthesis of $Na_{1.07}Al_3(SO_4)_{2.42}(OH)_{5.23} \cdot 2.5H_2O$

Alunite type compound particles were synthesized in the same manner as in Comparative Example 1 except that the alkali equivalent ratio was changed to 1.3. The results are shown in Table 2.

Comparative Example 3

Synthesis of $Na_{0.18}Al_3(SO_4)_{2.11}(OH)_{4.96} \cdot 5.5H_2O$

Figure 13:
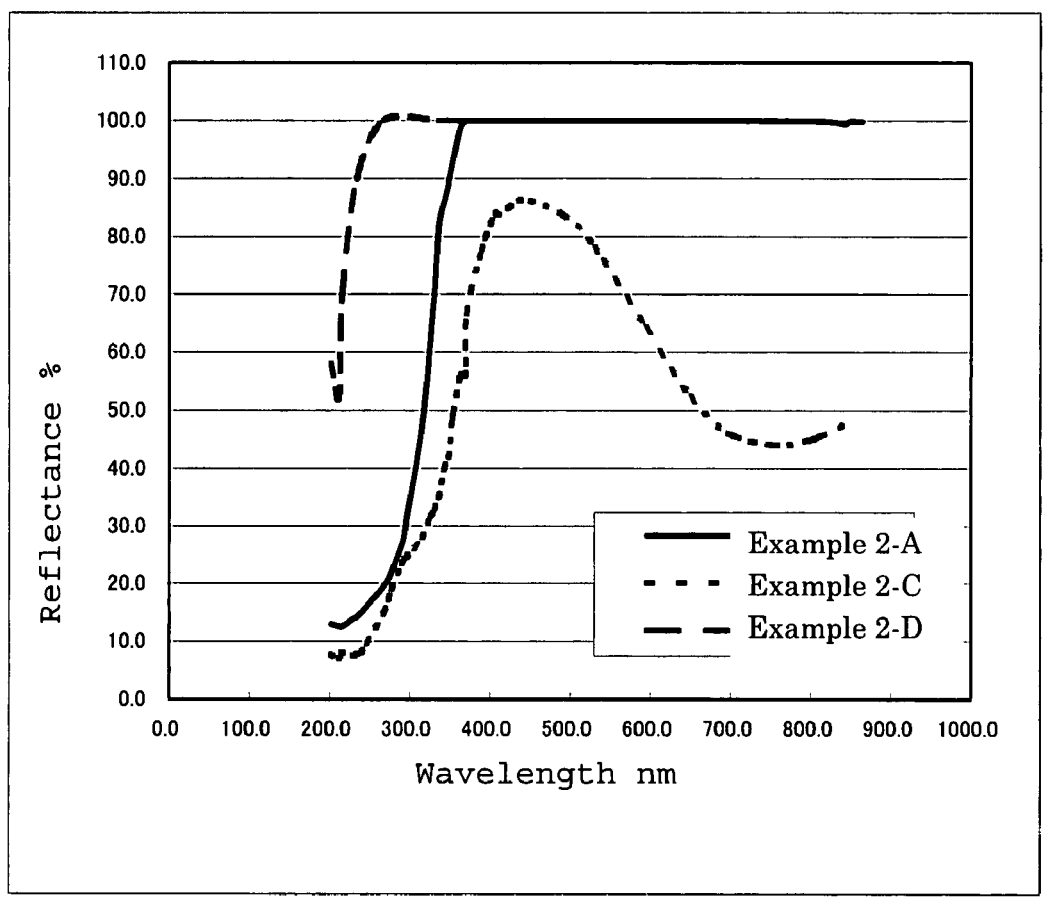
FIG. 13 is an ultraviolet to visible light reflection spectrum of alunite type compound particles of Examples 2-A, 2-C and 2-D (the horizontal axis shows wavelength (nm) and the vertical axis shows reflectance (%))

Alunite type compound particles were synthesized in the same manner as in Comparative Example 1 except that the alkali equivalent ratio was changed to 1.4. The results are shown in Table 2.

was injected into the above solution under agitation at room temperature over about 1 minute (alkali equivalent ratio: 1.0). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain a titanium hydrolysate carrier composition comprising spherical alunite type compound particles $Na_{0.89}[Al_{2.74}Ti_{0.26}](SO_4)_{2.17}(OH)_{5.81} \cdot 1.72H_2O$ as a base material. The characteristic properties of the obtained carrier composition are shown in Table 3. The obtained titanium hydrolysate carrier composition showed an ultraviolet to visible light reflection spectrum as shown in FIG. 13.

Example 2-B Synthesis of Tin Hydrolysate Carrier Composition 88 ml of an aqueous solution of aluminum sulfate having a concentration of 1.025 mol/l and 12.78 g (0.09 mol) of sodium sulfate were added to deionized water to prepare 500 ml of a solution. Meanwhile, a mixture solution of 7.2 g (0.027 mol) of sodium stannate trihydrate and 87 ml of 3.382 N sodium hydroxide solution was mixed with deionized water to prepare 150 ml of a solution. The latter solution was injected into the former solution under agitation at room temperature over about 1 minute (alkali equivalent ratio: 0.90). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain a tin hydrolysate carrier composition comprising spherical alunite type compound particles $Na_{1.06}[Al_{2.86}Sn_{0.14}](SO_4)_{2.15}(OH)_{5.9} \cdot 1.39H_2O$ as a base material. The characteristic properties of the obtained alunite type compound particles are shown in Table 3.

TABLE 2

| | Hydroxide | | Water-soluble compound Type | Reaction conditions | | Particle size distribution | | | |
|---|---|---|---|---|---|---|---|---|---|
| C. Ex. | Type | Equivalent ratio | | Temperature °C. | Time h | Average μm | Standard deviation μm | Coefficient of variation % | $D_{75}/D_{25}$ |
| 1 | NaOH | 0.58 | $Al_2(SO_4)_3$ | 170 | 2 | 4.898 | 3.184 | 65.0 | 1.294 |
| 2 | NaOH | 1.3 | $Al_2(SO_4)_3$ | 170 | 2 | 2.087 | 1.773 | 85.0 | 2.55 |
| 3 | NaOH | 1.4 | $Al_2(SO_4)_3$ | 90 | 2 | 35.3 | 30.4 | 86.1 | 2.69 |

| C. Ex. | BET $m^2/g$ | Bulk density g/ml | Refractive index | Particle shape | Composition formula |
|---|---|---|---|---|---|
| 1 | 7.1 | — | — | agglomerate | $Na_{1.00}Al_3(SO_4)_{2.36}(OH)_{5.28} \cdot 2.87H_2O$ |
| 2 | 52.6 | — | — | agglomerate | $Na_{1.07}Al_3(SO_4)_{2.42}(OH)_{5.23} \cdot 2.5H_2O$ |
| 3 | 42.2 | — | — | agglomerate | $Na_{0.18}Al_3(SO_4)_{2.11}(OH)_{4.96} \cdot 5.5H_2O$ |

C. Ex.: Comparative Example

Example 2 Synthesis of Carrier Composition

Example 2-A Synthesis of Titanium Hydrolysate Carrier Composition 117 ml of an aqueous solution of aluminum sulfate having a concentration of 1.03 mol/l, 127 ml (0.024 mol) of a 30% titanium sulfate solution and 17.04 g (0.12 mol) of sodium sulfate were added to deionized water to prepare 500 ml of a solution, and 171 ml of 3.382 N sodium hydroxide solution

Example 2-C Synthesis of Copper Hydrolysate Carrier Composition 98 ml of an aqueous solution of aluminum sulfate having a concentration of 1.025 mol/l, 18.9 g (0.0756 mol) of copper sulfate and 14.2 g (0.1 mol) of sodium sulfate were added to deionized water to prepare 500 ml of a solution, and 188 ml of 3.382 N sodium hydroxide solution was injected into the above solution under agitation at room temperature over about 1 minute (alkali equivalent ratio: 0.90). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain a copper hydrolysate carrier composition comprising hexagonal alunite type compound particles $Na_{1.06}[Al_{2.65}Cu_{0.35}](SO_4)_{2.13}(OH)_{5.45} \cdot 5.84H_2O$ as a base material. Table 3 shows the characteristic properties of the obtained carrier composition and FIG. 7 shows an SEM photomicrograph of the composition particles. The obtained copper hydrolysate carrier composition showed an ultraviolet to visible light absorption spectrum as shown in FIG. 13.

Example 2-D Synthesis of Zirconium Hydrolysate Carrier Composition 117 ml of an aqueous solution of aluminum sulfate having a concentration of 1.03 mol/l, 11.9 g (0.0369 mol) of zirconium oxychloride octahydrate and 17.04 g (0.12 mol) of sodium sulfate were added to deionized water to prepare 500 ml of a solution, and 186 ml of 3.385 N sodium hydroxide solution was injected into the above solution under agitation at room temperature over about 1 minute (alkali equivalent ratio: 1.0). After another 20 minutes of agitation, the resulting solution was transferred to an autoclave to carry out a hydrothermal reaction at 170° C. for 2 hours. The reaction solution was cooled to 25° C., filtered, rinsed with 500 ml of water and dried at 105° C. for 22 hours to obtain a copper hydrolysate carrier composition comprising hexagonal alunite type compound particles $Na_{0.76}[Al_{2.60}Zr_{0.4}](SO_4)_{1.65}(OH)_{6.86} \cdot 0.25H_2O$ as a base material. Table 3 shows the characteristic properties of the obtained carrier composition. The obtained copper hydrolysate carrier composition showed an ultraviolet to visible light absorption spectrum as shown in FIG. 13.

Example 3 Measurement of Particle Size Distribution Width

Figure 9:
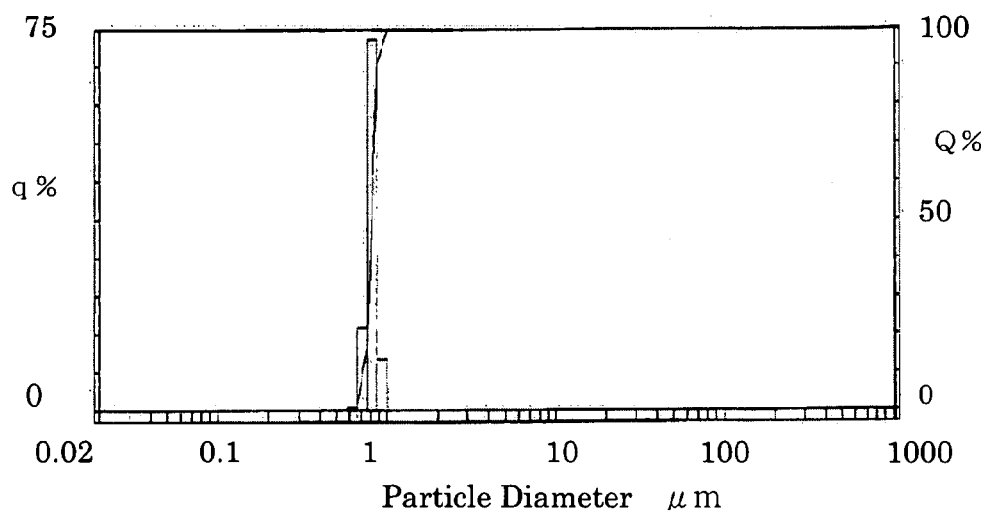
FIG. 9 is a particle size distribution diagram of alunite type compound particles of Example 1-E (the horizontal axis shows particle diameter, the longitudinal axis on the left side shows percentage (%: based on the total number of particles, represented by a bar), and the longitudinal axis on the right side shows cumulative percentage (%: based on the total number of particles, represented by a kinked line)

The average particle diameters, standard deviations, coefficients of variation and the $D_{75}/D_{25}$ ratios when $D_{75}$ is the particle diameter of particles which account for 75% of the total and $D_{25}$ is the particle diameter of particles which account for 25% of the total in the cumulative particle size distribution curve are shown in Tables 1, 2 and 3 based on the particle size distributions measured by the laser diffraction method of the alunite type compound particles obtained in the above Examples 1-A to 1-P, Comparative Examples 1 to 3 and Examples 2-A to 2-D. The particle size distribution of the alunite type compound particles synthesized in Example 1-E is shown in FIG. 9.

The $D_{75}/D_{25}$ ratios of all of the alunite type compound particles obtained in Examples of the present invention are 1.2 or less, which means that the alunite type compound particles have much higher particle size uniformity than the alunite type compound particles of the prior art.

Example 4 Acid Resistance Test (i) Sample

The alunite type compound particles (average particle diameter of 0.8 μm, BET specific surface area of 6.9 $m^2/g$) synthesized in Example 1-D were used.

(ii) Testing Method 1.0 g of the above sample was added to 100 ml of a 5 N $HNO_3$ aqueous solution, stirred and left to stand for 3 hours to measure the contents of aluminum and $SO_4$ in the resulting solution by an atomic absorption method.

(iii) Results

Figure 11:
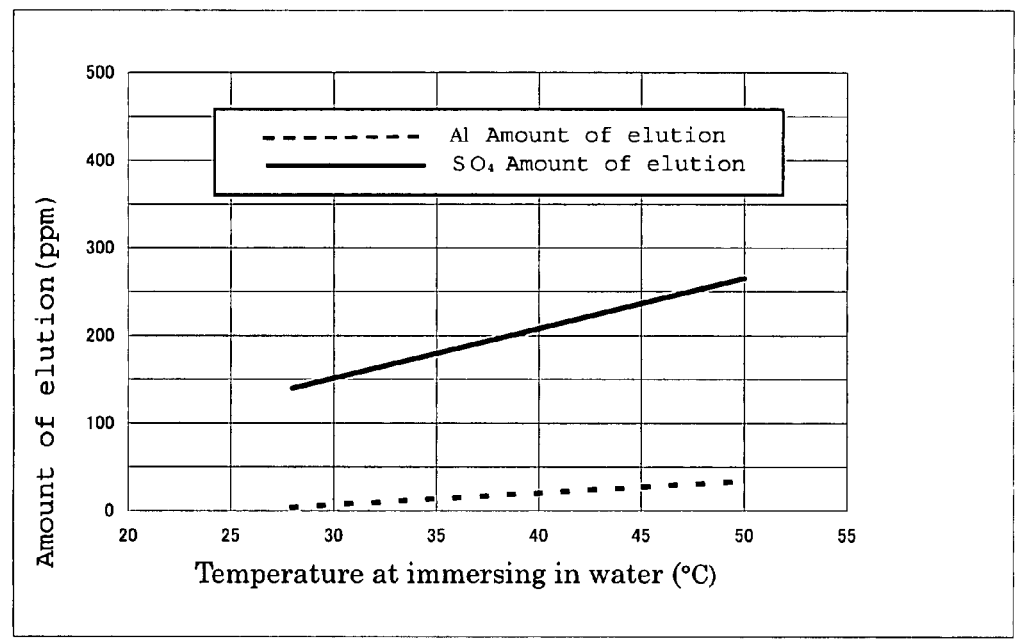
FIG. 11 is a graph showing the relationship between temperature and elution when alunite type compound particles of Example 1-D are immersed in an acid solution.

As shown in FIG. 11, when the temperature of a water bath was raised, the solubility of the sample increased. However, the elution of the sample was little and the particle shape did not change.

TABLE 3

| Ex. | Hydroxide Type | Equivalent ratio | Water-soluble compound Type | Reaction conditions Temperature °C. | Time h | Average μm | Standard deviation μm | Coefficient of variation % | $D_{75}/D_{25}$ |
|---|---|---|---|---|---|---|---|---|---|
| 2-A | NaOH | 1.0 | $Al_2(SO_4)_3$ $Ti(SO_4)_3$ | 170 | 2 | 0.75 | 0.07 | 9.4 | 1.16 |
| 2-B | NaOH | 0.90 | $Al_2(SO_4)_3$ $NaSnO_3$ | 170 | 2 | 0.78 | 0.056 | 7.2 | 1.13 |
| 2-C | NaOH | 0.90 | $Al_2(SO_4)_3$ $CuSO_4$ | 170 | 2 | 0.73 | 0.061 | 8.4 | 1.12 |
| 2-D | NaOH | 1.0 | $Al_2(SO_4)_3$ $ZrOCl_2$ | 170 | 2 | 2.66 | 0.322 | 12.1 | 1.19 |

| Ex. | BET $m^2/g$ | Bulk density g/ml | Refractive index | Particle shape (SEM photomicrograph) | Composition formula |
|---|---|---|---|---|---|
| 2-A | 26.9 | — | — | Spherical | $Na_{0.89}[Al_{2.74}Ti_{0.26}](SO_4)_{2.17}(OH)_{5.81} \cdot 1.72H_2O$ |
| 2-B | 55.7 | 0.91 | 1.5490 | Spherical | $Na_{1.06}[Al_{2.86}Sn_{0.14}](SO_4)_{2.15}(OH)_{5.9} \cdot 1.39H_2O$ |
| 2-C | 6.9 | 0.59 | 1.5518 | Hexagonal (FIG. 7) | $Na_{1.06}[Al_{2.65}Cu_{0.35}](SO_4)_{2.13}(OH)_{5.45} \cdot 2.84H_2O$ |
| 2-D | 67.1 | — | — | Hexagonal | $Na_{0.76}[Al_{2.60}Zr_{0.40}](SO_4)_{1.65}(OH)_{6.86} \cdot 0.25H_2O$ |

Ex.: Example

Example 5 Bad-Smelling Gas Adsorption Test

An adsorption test was conducted on two different types of alunite type compound particles and activated carbon (of Wako Pure Chemical Industries, Ltd.) which is commonly used as an adsorbent in accordance with a method which will be described hereinafter by using iso-valeric acid $(CH_3)_2CHCHCOOH$, ammonia gas $NH_3$ and trimethylamine $(CH_3)_3N$.

(i) Sample

Example 5-A

The alunite type compound particles (spherical, BET specific surface area of 121.1 $m^2/g$) synthesized in Example 1-E were used.

Example 5-B

The alunite type compound particles (spherical, BET specific surface area of 11.3 $m^2/g$) synthesized in Example 1-I were used.

Comparative Example 4

Commercially available activated carbon (of Wako Pure Chemical Industries, Ltd.) was used.

(ii) Testing Method

An adsorption test was conducted in accordance with a method which will be described hereinafter.

(iii) Results

The obtained bad-smelling gas absorption rates are shown in Table 4. Since Example 5-A has a larger BET value than Example 5-B, it has a higher adsorption rate. Both examples have a higher ammonia absorption rate than activated carbon. These results show that the alunite type compound particles of the present invention are useful as an alkaline substance adsorbent.

TABLE 4

| Bad-smelling gas | Example adsorption rate % | | activated carbon of Comparative Example 4 |
|---|---|---|---|
| | 5-A | 5-B | |
| iso-valeric acid | 64 | 23 | 93 |
| ammonia | 93 | 76 | 32 |
| trimethylamine | 43 | 40 | 83 |

Example 6 Dye Adsorption Test

The adsorptivities of Congo Red $(C_{32}H_{22}N_6O_6S_2Na_2)$, Sudan Black B (Sudanschwarz B), Titan Yellow $(C_{28}H_{19}N_5O_6S_4Na_2)$ (all manufactured by Wako Pure Chemical Industries, Ltd.), C.I. Direct Black 51 $(C_{27}H_{17}N_5O_8Na_2)$ (of Hodogaya Chemical Co., Ltd.) and Green FLB (of Dainichiseika Color & Chemicals Mfg. Co., Ltd.) were investigated.

(i) Sample

Example 6-A

The alunite type compound particles synthesized in Example 1-B (spherical, BET specific surface area of 4.4 $m^2/g$) were used.

Example 6-B

The alunite type compound particles synthesized in Example 1-E (spherical, BET specific surface area of 121.1 $m^2/g$) were used.

Example 6-C

The alunite type compound particles synthesized in Example 1-G (spherical, BET specific surface area of 61.2 $m^2/g$) were used.

Example 6-D

The alunite type compound particles synthesized in Example 1-I (spherical, BET specific surface area of 11.3 $m^2/g$) were used.

Comparative Example 5

Activated carbon which is commonly used as an adsorbent was used.

(ii) Testing Method 10 mg of a dye was injected into 100 ml of pure water and fully stirred, and then 2 g of the above sample was added. After 15 hours of agitation, the concentration of the dye was analyzed by spectrophotometry.

(iii) Results

The dye adsorption rates are shown in Table 5 below.

According to Table 5 below, the results of Examples 6-A to 6-D show that the alunite type compound particles of the present invention well adsorb an acid dye, direct dye, basic dye and reaction dye. Therefore, the alunite type compound particles of the present invention are useful as a coloring aid, pigment or carrier for organic polymers such as resins.

TABLE 5

| Dye | Example Adsorption rate % | | | | Activated carbon of Comparative Example 5 |
|---|---|---|---|---|---|
| | 6-A | 6-B | 6-C | 6-D | |
| Congo Red | 59.22 | 99.87 | 99.65 | 78.99 | 2.42 |
| Sudan BlackB (Sudanschwarz B) | 92.37 | 99.75 | 97.65 | 94.32 | 8.64 |
| Titan Yellow | 79.14 | 99.55 | 99.24 | 85.55 | 5.74 |
| C.I. Direct Black 51 | 92.43 | 100 | 100 | 98.11 | 5.00 |
| Green FLB | 99.58 | 100 | 100 | 100 | 4.85 |

Example 7 Test of Elongation Percentage of Resin Composition (i) Sample

Example 7-A

A 3 wt % stearic acid adsorbed product prepared by treating the spherical alunite type compound particles (spherical, average particle diameter of 1.13 μm, BET specific surface area of 4.4 $m^2/g$) synthesized in Example 1-B with sodium stearate was used.

Comparative Example 6

A 3 wt % stearic acid adsorbed product prepared by treating magnesium hydroxide which is widely used as an additive (hexagonal, average particle diameter of 0.8 μm, BET specific surface area of 5.0 $m^2/g$) with sodium stearate was used.

(ii) Testing Method

The above sample and an antioxidant (DLTP: dilauryl thiodopropionate of Yoshitomi Pharmaceutical Co., Ltd. and IR1010: Irganox of Chiba Special Chemical Co., Ltd.) were mixed with a polypropylene resin (ethylene.propylene copolymer) in a ratio shown in Table 6, and a sample piece for a tensile test was formed from the obtained resin composition by the FS120S18ASE injection molding machine of Nissei Jushi Kogyo Co., Ltd. to measure its elongation percentage. The measurement results are shown in Table 6 below.

(iii) Results

It is understood from Table 6 that the elongation percentage of a resin obtained by kneading the alunite type compound particles of the present invention is 10 times or more larger than that of a conventionally known additive.

TABLE 6

| Example | Item | | Tensile strength at yield point (kgf/mm$^2$) | Elongation at break % |
|---|---|---|---|---|
| 7-A | 1. Polypropylene: | 100 | 1.68 | 410 |
| | 2. Alunite type compound particle: | 150 | | |
| | 3. DLTP: | 0.25 | | |
| | 4. IR1010: | 0.25 | | |
| C. Ex. 6 | 1. Polypropylene: | 100 | 1.9 | 30 |
| | 2. Magnesium hydroxide: | 150 | | |
| | 3. DLTP: | 0.25 | | |
| | 4. IR1010: | 0.25 | | |

C. Ex.: Comparative Example

Example 8 Infrared Light Absorptivity Test

Figure 12:
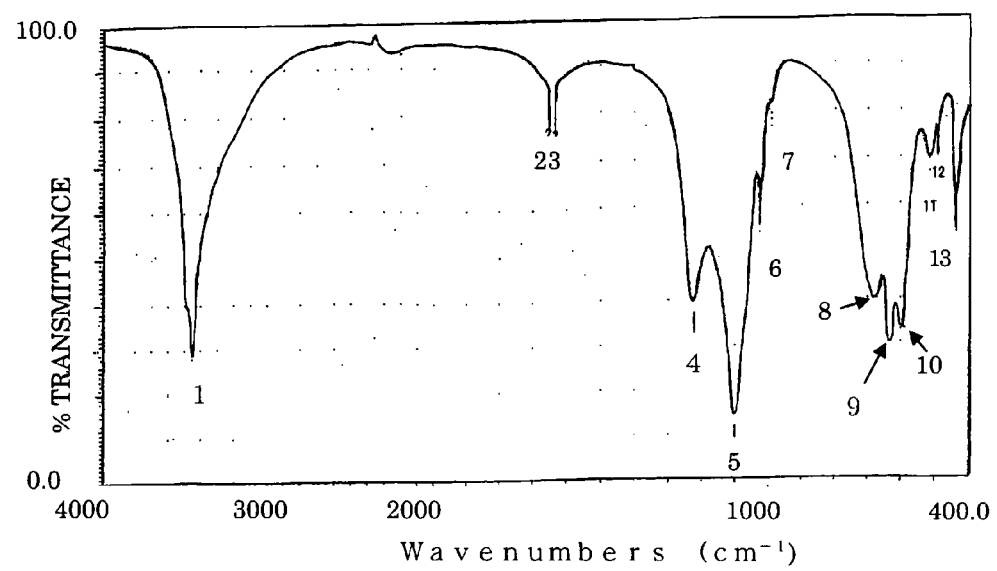
FIG. 12 shows an IR spectrum of alunite type compound particles of Example 1-D (the horizontal axis shows wavelength ($cm^{-1}$) and the vertical axis shows transmittance (%))

When the IR analysis of the alunite type compound particles $Na_{1.11}Al_3(SO_4)_{2.33}(OH)_{5.45} \cdot 1.9H_2O$ synthesized in Example 1-D was carried out by a KBr briquette method, the results shown in FIG. 12 were obtained. Since an IR absorption band is existent at around 1,000 to 1,400 cm$^{-1}$ (wavelength of 10 to 14 μm), it is obvious that the particles are useful as an infrared light absorber.

Example 9 Differential Thermal Analysis Test

Figure 10:
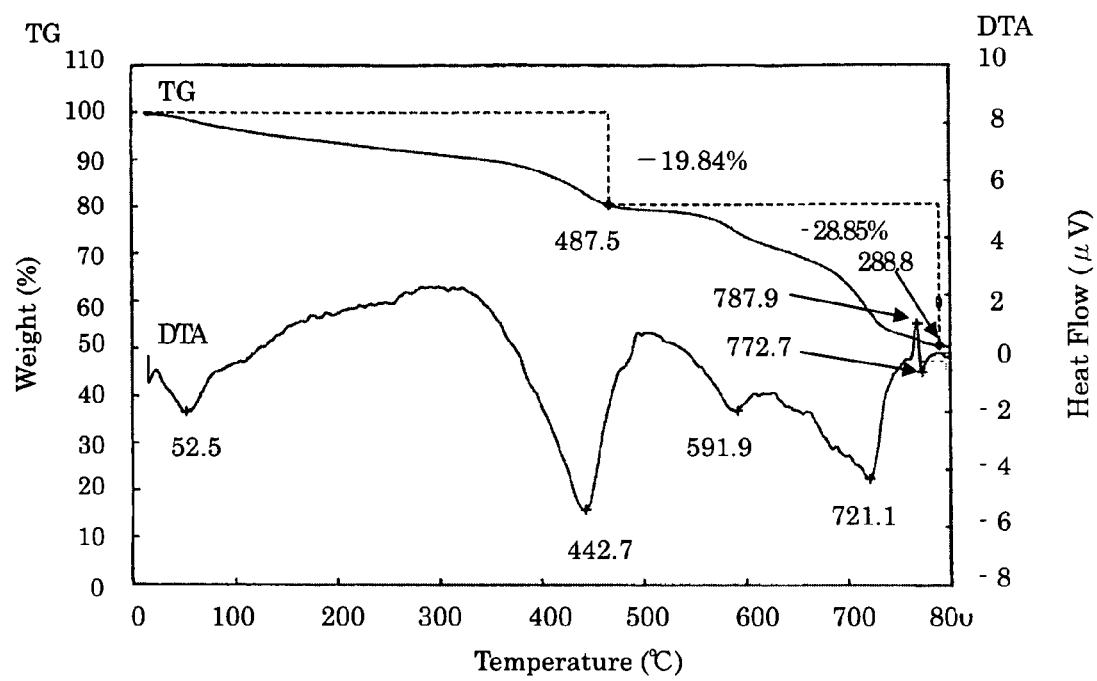
FIG. 10 is a differential thermal analysis diagram of alunite type compound particles of Example 1-D.

When the differential thermal analysis of the alunite type compound particles $Na_{1.11}Al_3(SO_4)_{2.33}(OH)_{5.45} \cdot 1.9H_2O$ synthesized in Example 1-D was carried out, the results shown in FIG. 10 were obtained. The alunite type compound particles are thermally stable up to 400° C. or higher.

Example 10

Figure 16:
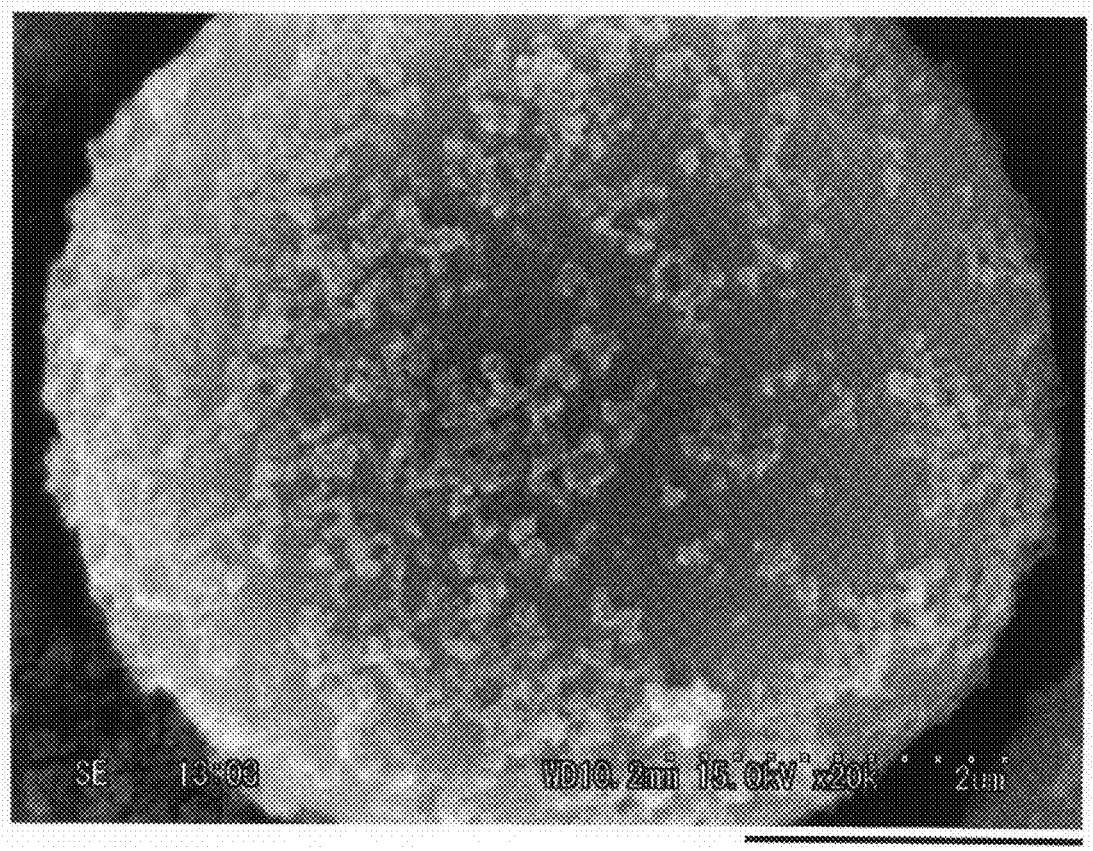
FIG. 16 is an SEM photomicrograph of a titanium dioxide supporting alunite type compound particle obtained in Example 10.
Figure 17:
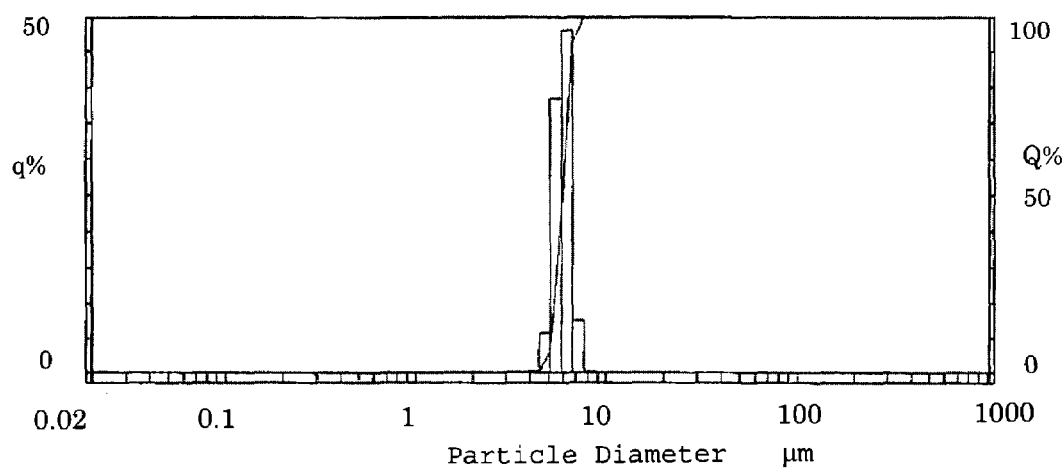
FIG. 17 is a particle size distribution diagram of titanium dioxide supporting alunite type compound particles obtained in Example 10.
Figure 18:
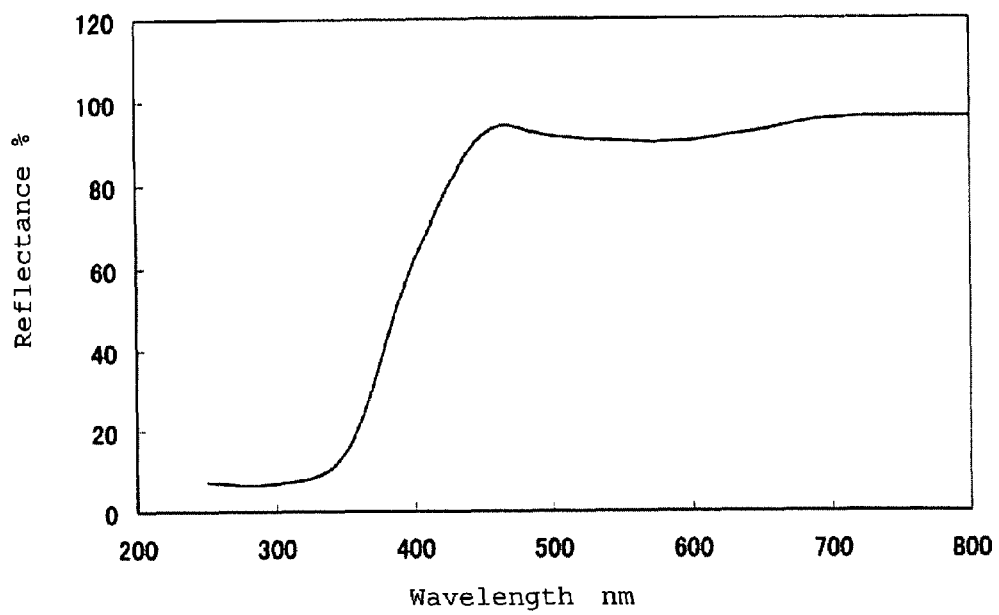
FIG. 18 is an ultraviolet to visible light reflection spectrum of titanium dioxide supporting alunite type compound particles obtained in Example 10.

Titanium Dioxide Supporting Alunite Type Compound Particles 50 g of the spherical alunite type compound particles (average particle diameter of 5.9 μm, $D_{75}/D_{25}$ of 1.16) synthesized by the process of the present invention and 10 g of titanium dioxide were added to 500 ml of deionized water, and the obtained suspension was stirred at 40° C. for 3 hours, filtered, rinsed and dried at 105° C. for 22 hours to obtain spherical titanium oxide supporting alunite type compound particles. FIG. 16 shows an SEM photomicrograph of the surface of the obtained carrier composition and FIG. 17 shows the particle size distribution of the composition. FIG. 18 shows an ultraviolet to visible light reflection spectrum of the carrier composition. The obtained carrier composition shows the same average particle diameter and particle size uniformity (average particle diameter of 5.96 μm, $D_{75}/D_{25}$ of 1.16) as the spherical alunite type compound particles as the base material, and agglomeration is not seen.

The invention claimed is:

1. Alunite type compound particles which are represented by the following general formula (I) and have a particle size distribution sharpness Ds ($=D_{75}/D_{25}$) of 1 to 1.4 when $D_{25}$ is the particle diameter of particles which account for 25% of the total and $D_{75}$ is the particle diameter of particles which account for 75% of the total in the cumulative particle size distribution curve measured by a laser diffraction method and a spherical particle shape:

$$M_a[Al_{1-x}M'_x]_3(SO_4^{2-})_y(OH)_z \cdot mH_2O \qquad (I)$$

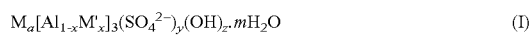

wherein M is at least one cation selected from the group consisting of Na$^+$, K$^+$, NH$_4^+$ and H$_3$O$^+$, M' is at least one cation selected from the group consisting of Cu$^{2+}$, Zn$^{2+}$, Ni$^{2+}$, Sn$^{4+}$, Zr$^{4+}$ and Ti$^{4+}$, and a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, respectively.

2. The alunite type compound particles according to claim 1, which have a particle size distribution sharpness Ds ($=D_{75}/D_{25}$) of 1 to 1.3.

3. The alunite type compound particles according to claim 1, which have an average secondary particle diameter measured by the laser diffraction method of 0.2 to 6 μm.

4. The alunite type compound particles according to claim 1, which have an average secondary particle diameter measured by the laser diffraction method of 0.3 to 2 μm.

5. Alunite type compound particles which are represented by the following general formula (I) and have a disk-like or hexagonal particle shape:

$$M_a[Al_{1-x}M'_x]_3(SO_4^{2-})_y(OH)_z \cdot mH_2O \qquad (I)$$

wherein M is at least one cation selected from the group consisting of Na$^+$, K$^+$, NH$_4^+$ and H$_3$O$^+$, M' is at least one cation selected from the group consisting of Cu$^{2+}$, Zn$^{2+}$, Ni$^{2+}$, Sn$^{4+}$, Zr$^{4+}$ and Ti$^{4+}$, and a, m, x, y and z satisfy $0.8 \leq a \leq 1.35$, $0 \leq m \leq 5$, $0 \leq x \leq 0.4$, $1.7 \leq y \leq 2.5$, and $4 \leq z \leq 7$, respectively wherein alunite type compound particles have a particle size distribution sharpness Ds ($=D_{75}/D_{25}$) of 1 to 1.8 when $D_{25}$ is the particle diameter of particles which account for 25% of the total and $D_{75}$ is the particle diameter of particles which account for 75% of the total in the cumulative particle size distribution curve measured by the laser diffraction method.

6. The alunite type compound particles according to claim 5, which have a particle size distribution sharpness Ds ($=D_{75}/D_{25}$) of 1.01 to 1.7.

7. The alunite type compound particles according to claim 5, which have an average secondary particle diameter measured by the laser diffraction method of 0.2 to 10 μm.

8. The alunite type compound particles according to claim 5, which have an average secondary particle diameter measured by the laser diffraction method of 0.3 to 5 μm.

9. The alunite type compound particles according to claim 1 or 5, which support a hydrolysate of at least one metal salt selected from the group consisting of Cu, Zn, Ni, Sn, Zr and Ti on the surface.

10. The alunite type compound particles according to claim 1 or 5, which have an aspect ratio represented by the ratio of the short diameter S to the long diameter L of each particle of 0.6 to 1.0 in an SEM photomicrograph of the particle.

11. The alunite type compound particles according to claim 1 or 5 whose surface is treated with at least one surface treating agent selected from the group consisting of a higher fatty acid, an anionic surfactant, a phosphate, a coupling agent and an ester of a polyhydric alcohol and an fatty acid.

12. A process for manufacturing alunite type compound particles, comprising the steps of adding a hydroxide solution of at least one cation selected from the group (second group) consisting of $Na^+$, $K^+$, and $NH_4^+$ to a mixture solution of a compound of an element based on at least one cation including $Al^{3+}$ as an essential component, selected from the group (first group) consisting of $Al^{3+}$, $Cu^{2+}$, $Zn^{2+}$, $Ni^{2+}$, $Sn^{4+}$ and $Zr^{4+}$, which is water-soluble at a pH of 1 to 7, and a sulfate of the above cation selected from the second group to ensure that the alkali equivalent ratio becomes 0.6 to 1.1 and carrying out a reaction by heating to form the alunite-type compound particles of claim 1.

13. A process for manufacturing alunite type compound particles, comprising the steps of adding a hydroxide solution of at least one cation selected from the group (second group) consisting of $Na^+$, $K^+$, and $NH_4^+$ to a mixture solution of compounds of elements based on at least two cations including $Al^{3+}$ and $Ti^{4+}$ as essential components, selected from the group (first group) consisting of $Al^{3+}$, $Cu^{2+}$, $Zn^{2+}$, $Ni^{2+}$, $Sn^{4+}$, $Zr^{4+}$ and $Ti^{4+}$, which are water-soluble at a pH of 1 to 7, and a sulfate of the above cation selected from the second group to ensure that the alkali equivalent ratio becomes 0.6 to 1.2 and carrying out a reaction by heating to form the alunite-type compound particles of claim 1.

14. The process for manufacturing alunite type compound particles according to claim 12 or 13, wherein the hydroxide solution is added to ensure that the alkali equivalent ratio becomes 0.7 to 0.9 and the reaction is carried out by heating.

15. The process for manufacturing alunite type compound particles according to claim 12 or 13, wherein the reaction is carried out by heating at 90 to 250° C.

16. A resin additive which comprises the alunite type compound particles of claim 1 or 5.

17. A resin composition which comprises the alunite type compound particles of claim 1.

18. An adsorbent composition which comprises the alunite type compound particles of claim 1 or 5.

19. A dye carrier which comprises the alunite type compound particles of claim 1 or 5.

20. An ultraviolet light absorber which comprises the alunite type compound particles of claim 1 or 5.

* * * * *